US012508223B2

(12) United States Patent
Moritani et al.

(10) Patent No.: US 12,508,223 B2
(45) Date of Patent: Dec. 30, 2025

(54) PARTICLE CONTAINING LIPID NANOPARTICLES AND METHOD FOR PRODUCING SAME

(71) Applicants: Tatsuru Moritani, Tokyo (JP); SHIZUOKA PREFECTURAL UNIVERSITY CORPORATION, Shizuoka (JP)

(72) Inventors: Tatsuru Moritani, Kanagawa (JP); Satomi Onoue, Shizuoka (JP); Hideyuki Sato, Shizuoka (JP)

(73) Assignees: Ricoh Company, Ltd., Tokyo (JP); SHIZUOKA PREFECTURAL UNIVERSITY CORPORATION, Shizuoka (JP)

( * ) Notice: Subject to any disclaimer, the term of this patent is extended or adjusted under 35 U.S.C. 154(b) by 301 days.

(21) Appl. No.: 17/998,895

(22) PCT Filed: May 18, 2021

(86) PCT No.: PCT/JP2021/018751
§ 371 (c)(1),
(2) Date: Nov. 15, 2022

(87) PCT Pub. No.: WO2021/235425
PCT Pub. Date: Nov. 25, 2021

(65) Prior Publication Data
US 2023/0210767 A1    Jul. 6, 2023

(30) Foreign Application Priority Data
May 20, 2020    (JP) ................. 2020-088154

(51) Int. Cl.
*A61K 9/00*    (2006.01)
*A61K 9/16*    (2006.01)
*A61K 9/50*    (2006.01)
*A61K 9/51*    (2006.01)
*A61K 38/13*    (2006.01)

(52) U.S. Cl.
CPC .......... *A61K 9/0075* (2013.01); *A61K 9/1617* (2013.01); *A61K 9/5089* (2013.01); *A61K 9/5123* (2013.01); *A61K 38/13* (2013.01)

(58) Field of Classification Search
CPC ....... A61K 9/0075; A61K 38/28; A61K 9/127
See application file for complete search history.

(56) References Cited

U.S. PATENT DOCUMENTS

| | | | |
|---|---|---|---|
| 2002/0106403 | A1 | 8/2002 | Parikh et al. |
| 2003/0166509 | A1 | 9/2003 | Edwards et al. |
| 2012/0321698 | A1 | 12/2012 | Narain et al. |
| 2019/0076361 | A1 | 3/2019 | Onoue et al. |
| 2019/0247314 | A1 | 8/2019 | Shiraishi et al. |
| 2019/0292333 | A1 | 9/2019 | Moritani et al. |
| 2019/0302633 | A1 | 10/2019 | Morinaga et al. |
| 2022/0023216 | A1 | 1/2022 | Moritani et al. |

FOREIGN PATENT DOCUMENTS

| | | |
|---|---|---|
| JP | 8-133986 | 5/1996 |
| JP | 2005-511629 | 4/2005 |
| JP | 4228230 | 2/2009 |
| JP | 2011-137031 | 7/2011 |
| JP | 5932993 | 6/2016 |
| JP | 2017-160188 | 9/2017 |
| JP | 2019-137670 | 8/2019 |
| JP | 2019-167506 | 10/2019 |
| JP | 2019-177371 | 10/2019 |
| JP | 2020-152674 | 9/2020 |
| JP | 2021-004234 | 1/2021 |
| JP | 2021-028305 | 2/2021 |
| JP | 2021-147329 | 9/2021 |
| WO | 00/30616 | 6/2000 |
| WO | 03/043586 | 5/2003 |
| WO | 2017/127641 | 7/2017 |
| WO | 2017/150692 | 9/2017 |
| WO | 2021/029438 | 2/2021 |
| WO | 2021/187289 | 9/2021 |

OTHER PUBLICATIONS

Kerrich-Santo et al. Eur. J. Biochem. 1974, 43, 521-532. (Year: 1974).*
Canadian Office Action received for Canadian Patent Application No. 3,183,691, dated Mar. 22, 2024, 6 pages.
Extended European Search Report dated May 8, 2024, in European Application No. 21808125.5, 9 pages.
Sharon Shui Yee Leung et al., "Porous mannitol carrier for pulmonary delivery of cyclosporine A nanoparticles", The AAPS Journal, vol. 19, No. 2, Jan. 9, 2017, pp. 578-586.
Thomas L. Tolt et al., "Separation of dispersed phases from liquids in acoustically driven chambers", Chemical Engineering Science, vol. 48, No. 3, Feb. 1, 1993, pp. 527-540.
Freitas et al., "Spray-drying of solid lipid nanoparticles (SLN™)", European Journal of Pharmaceutics and Biopharmaceutics vol. 46, 1998, pp. 145-151.
International Search Report dated on Jul. 20, 2021, in PCT/JP2021/018751, with English Translation, 4 pages.
Office Action received for Japanese Patent Application No. 2022-524485, mailed on Jan. 14, 2025, 18 pages with English translation.
Takeuchi et al., "Particulate Design for Inhalation Dosage Forms", Journal of the Society of Powder Technology of Japan, vol. 39, No. 2, Feb. 10, 2002 7 pages with Partial English translation.

(Continued)

*Primary Examiner* — Genevieve S Alley
(74) *Attorney, Agent, or Firm* — Grüneberg and Myers PLLC

(57) ABSTRACT

A particle includes at least one or more kinds of substrate and lipid nanoparticles. The lipid nanoparticles are dispersed in the substrate and contain a physiologically active substance. The lipid nanoparticles are one or more kinds selected from liposomes, lipid emulsions, and solid lipid nanoparticles. A corresponding powder inhalant contains the particle. A production method for the particle includes granulating and drying, in which a suspension containing the substrate and the lipid nanoparticles are granulated and dried in a gas medium.

6 Claims, 7 Drawing Sheets

(56) References Cited

OTHER PUBLICATIONS

Tetsuya Ozeki, "Therapeutic inhalable nano-sized particles dispersed in microspheres", Drug Delivery System, vol. 24, No. 5, Jan. 2009, pp. 484-491 (with English Abstract).
Tomoyuki Okuda, "Development of Inhalable Dry Powder Formulations Loaded with Nanoparticles Maintaining their Original Physical Properties and Functions", Yakugaku Zasshi, vol. 137, No. 11, Jun. 29, 2017, pp. 1339-1348 (with English Abstract).
Walters et al., "Next Generation Drying Technologies for Pharmaceutical Applications", Journal of Pharmaceutical Sciences, vol. 103, Jun. 10, 2014, pp. 2673-2695.
Zhang et al., "Review: Fundamentals, applications and potentials of ultrasound-assisted drying", Chemical Engineering Research and Design, vol. 154, Nov. 22, 2019, pp. 21-46.
Office Action received for Canadian Patent Application No. 3,183,691, dated Jun. 16, 2025, 6 pages.

\* cited by examiner

▽: NEORAL (100mg/kg, ORAL ADMINISTRATION)
▲: PARTICLE OF EXAMPLE 1 (100μg-CsA/rat, INTRATRACHEAL ADMINISTRATION)
□: CYCLOSPORINE NANOPARTICLE (100μg-CsA/rat, INTRATRACHEAL ADMINISTRATION)

PARTICLE CONTAINING LIPID NANOPARTICLES AND METHOD FOR PRODUCING SAME

CROSS-REFERENCE TO RELATED APPLICATIONS

This application is the National Stage entry under § 371 of International Application No. PCT/JP2021/018751, filed on May 18, 2021, and which claims the benefit of priority to Japanese Application No. 2020-088154, filed on May 20, 2020. The content of each of these applications is hereby incorporated by reference in its entirety.

FIELD OF THE INVENTION

The present invention relates to particles containing lipid nanoparticles and a method for producing the same. Priority is claimed on Japanese Patent Application No. 2020-088154, filed May 20, 2020, the content of which is incorporated herein by reference.

DESCRIPTION OF RELATED ART

In recent years, as carriers for drug delivery systems (DDS), liposomes, lipid emulsions, solid lipid nanoparticles and the like (hereinafter collectively referred to as lipid nanoparticles) have been focused on and have been actively studied.

Lipid nanoparticles are nanocarriers mainly composed of lipids such as phospholipids, fatty acids, and steroids, and allow drugs to be encapsulated into particles, and thus can control release of encapsulated drugs, minimize degradation due to hydrolysis/enzymatic degradation or the like, and allow efficient drug delivery to lesion sites.

Lipid nanoparticles have a very small particle size of about 100 nm, but they exist stably in a solution by using electrostatic repulsion of lipids, interaction between functional groups on the particle surface or the like. For these reasons, application of lipid nanoparticles to injectable formulations, particularly application as a carrier for cell delivery, is currently being actively examined (for example, refer to Patent Document 1).

In addition, lipid nanoparticles have also been confirmed to be effective as components for improving the solubility of poorly soluble drugs due to their large surface area according to their small particle size. In addition, it is possible to control release of drugs by appropriately selecting the type of lipids and the particle structure.

These features are effective for efficient oral absorption and local drug delivery in oral formulations, inhalation formulations and the like in addition to injectable formulations. For example, Patent Document 2 describes a method for inhalation by aerosolizing an aqueous solution containing nanoparticles composed of a physiologically active substance and a phospholipid. In addition, Patent Document 3 describes a method for solidifying liposomes to which cyclic inulooligosaccharides and polyhydric alcohols are added by freeze-drying.

SUMMARY OF INVENTION

Technical Problem

However, in consideration of storage stability, it is not preferable to store lipid nanoparticles in a solution. In addition, in consideration of the treatment time and dispersion stability of nanoparticles after drying, solidification of lipid nanoparticles by freeze-drying is not a preferable method for the production step.

A method of drying and pulverizing only lipid nanoparticles by a spray drying method is also conceivable, but it is clear that poor handling properties due to high adhesion and high cohesion specific to lipid nanoparticles would be a problem. Therefore, there is a demand for lipid nanoparticles and a method for producing the same through which the above problem can be addressed while maintaining properties of lipid nanoparticles. Here, an object of the present invention is to provide a pharmaceutical particle and formulation containing a lipid material suitable for pharmaceuticals and the like.

Solution to Problem

The particle according to the present invention is a particle including at least one or more kind of substrate and lipid nanoparticles, wherein the lipid nanoparticles are dispersed in the substrate, and wherein the lipid nanoparticles are one or more kind selected from the group consisting of liposomes, lipid emulsions and solid lipid nanoparticles and contain a physiologically active substance.

A method for producing the particle according to the present invention includes a granulating and drying step in which a suspension containing the substrate and the lipid nanoparticles are granulated and dried in a gas medium.

Advantageous Effects of Invention

According to the present invention, it is possible to provide particles having excellent powder properties without impairing properties of lipid nanoparticles.

DETAILED DESCRIPTION OF THE INVENTION (Particle)

Figure 1:
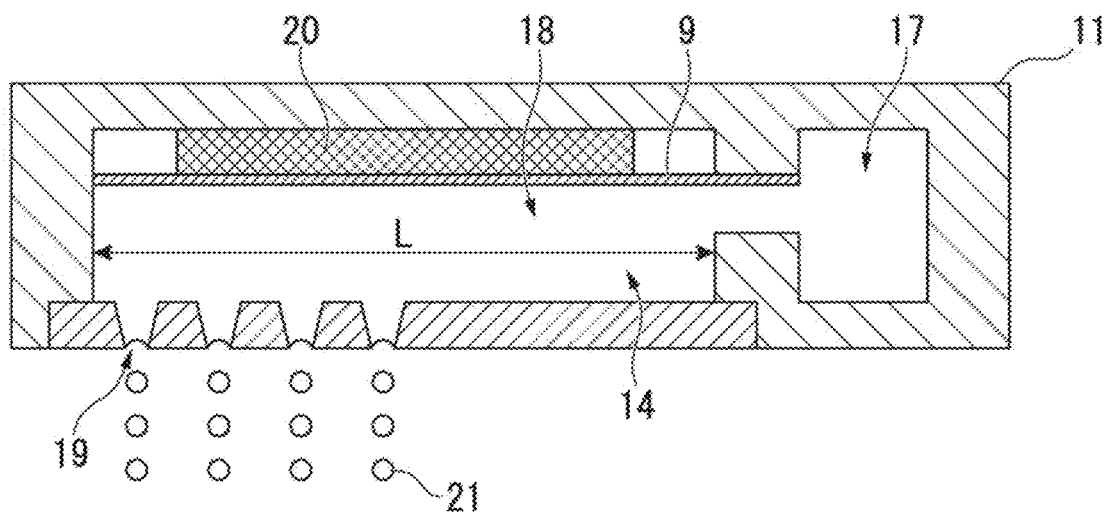
FIG. 1 is a schematic cross-sectional view showing an example of a liquid column resonance droplet discharging unit.

The particles of the present invention are particles containing at least one or more kind of substrate and lipid nanoparticles, the lipid nanoparticles are dispersed in the substrate, and the lipid nanoparticles are one or more kind selected from the group consisting of liposomes, lipid emulsions and solid lipid nanoparticles and contain a physiologically active substance. The physiologically active substance is encapsulated in lipid nanoparticles. In addition, the particles contain, as necessary, other materials. Any physiologically active substance may be used as long as it has some physiological activity in vivo.

In this specification. "particles" refers to a group of particulate compositions containing a substrate and a physiologically active substance unless otherwise specified. The particles of the present invention are typically functional particles that exhibit a desired function. The particles of the present invention can be designed to become functional particles having a desired function by appropriately selecting the substrate to be included. As functional particles, for example, in order to exhibit a desired physiological effect, particles that deliver a physiologically active substance to a target site, that is, particles used in a drug delivery system (DDS particles), sustained-release particles that continue to release a drug for a long time, and solubilizing particles for solubilizing a poorly soluble physiologically active substance are exemplary examples.

In this specification, the "substrate" is a component contained in the particle, and is a base material that constitutes each particle.

In this specification. "physiologically active substance" is an active component used to exhibit a physiological effect in a living body, and examples thereof include low-molecular-weight compounds including pharmaceutical compounds, food compounds, and cosmetic compounds, and high-molecular-weight compounds including biopolymers such as proteins such as antibodies and enzymes, and nucleic acids such as DNA and RNA. In addition, "physiological effect" is an effect obtained when the physiologically active substance exhibits physiological activity at a target site, and causes quantitative and/or qualitative changes or influences in, for example, living bodies, tissues, cells, proteins, DNA and RNA. In addition, "physiological activity" means that a physiologically active substance acts on, changes and influences a target site (for example, target tissue, etc.). The target site is preferably, for example, a receptor present on the cell surface or inside the cell. In this case, a signal is transmitted to cells according to physiological activity of the physiologically active substance binding to a specific receptor, and as result, the physiological effect is exhibited. The physiologically active substance may be a substance that is converted to a mature form with enzymes in vivo and then binds to a specific receptor and exhibits a physiological effect. In this case, in this specification, the physiologically active substance also includes the substance before being converted to a mature form. Here, the physiologically active substance may be a substance produced from an organism (human or non-human organism) or may be an artificially synthesized substance.

In this specification, the "property of changing physiological activity" includes, for example, a property of increasing or decreasing the degree of physiological activity, a property of increasing or decreasing the efficiency of physiological activity and a property of changing the type of physiological activity. A property of decreasing the degree of physiological activity or a property of decreasing the efficiency of physiological activity is preferable, and a property of decreasing the degree of physiological activity is more preferable. In addition, examples of changes in physiological activity include reversible changes and irreversible changes, and a property of irreversibly changing physiological activity is preferable.

In this specification, "heating" and "cooling" typically mean that thermal energy is applied to a liquid containing a physiologically active substance and thermal energy is removed from the liquid. When "heated" or "cooled," the physiological activity may change due to changes in the molecular structure or the three-dimensional structure of the physiologically active substance. Specifically, for example, when the physiologically active substance is a protein, thermal denaturation of the protein, low-temperature denaturation of the protein and the like are exemplary examples. In addition, when the physiologically active substance is a nucleic acid, degradation of the nucleic acid and the like are exemplary examples. As described above, the "temperature at which the physiological activity of the physiologically active substance changes" varies depending on the type of the physiologically active substance selected, but those skilled in the art who read this specification can easily recognize what temperature that would be.

In this specification. "external stress" is typically a force that is applied to a liquid containing a physiologically active substance from the outside. Examples of such external stress include shaking, stirring, shear stress and the like. When such external stress is applied, the physiological activity may change due to changes in the molecular structure and the three-dimensional structure of the physiologically active substance. Specifically, for example, when the physiologically active substance is a protein, deactivation of the protein due to the change in its higher-order structure is an exemplary example. Examples of proteins that are easily deactivated by external stress include proteins that form multimers, and specific examples thereof include enzymes and antibodies. Here, examples of treatments for generating external stress include a shaking treatment, a stirring treatment, a pulverization treatment, an ultrasonic treatment, a homogenizer treatment and a spraying treatment. Whether the external stress generated according to such a treatment corresponds to "external stress that changes the physiological activity of the physiologically active substance" varies depending on the type of the physiologically active substance selected, and those skilled in the art who read this specification can easily recognize what external stress that would be.

Next, the forms of particles will be described. Generally, examples of forms of DDS particles containing a substrate and a physiologically active substance include a capsule particle form in which a physiologically active substance is encapsulated in a substrate, support particles in which a physiologically active substance is supported on the surface of the substrate and other forms of particles. The particles of the present invention correspond to capsule particles and particularly dispersion-encapsulated particles, and the physiologically active substance that is encapsulated in lipid nanoparticles is encapsulated in particles.

The form of dispersed encapsulated component particles in the present invention is not particularly limited as long as the physiologically active substance encapsulated in lipid nanoparticles is dispersed and encapsulated in the substrate, and the degree of dispersion of the physiologically active substance in the substrate may not be uniform. In addition, when particles contain a plurality of types of substrates and one of these substrates is unevenly contained at a predetermined location in the particles, the degree of dispersion may differ depending on the type of the substrate at the location at which the physiologically active substance is encapsulated. Examples of particles corresponding to dispersed encapsulated component particles include liposomes, particles produced using an emulsion solvent diffusion method (ESD method), and particles produced using a spray drying method.

Figure 5A:
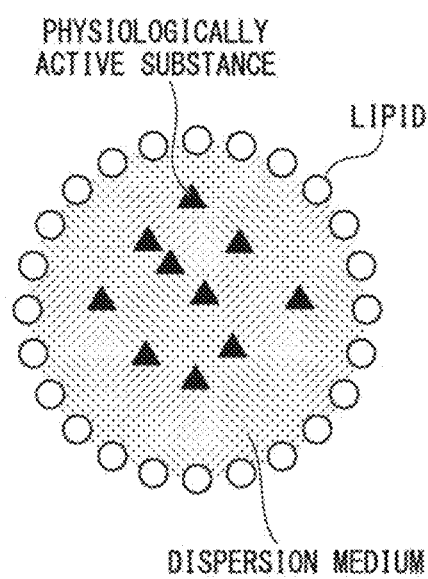
FIG. 5A shows an example of lipid nanoparticles.
Figure 5B:
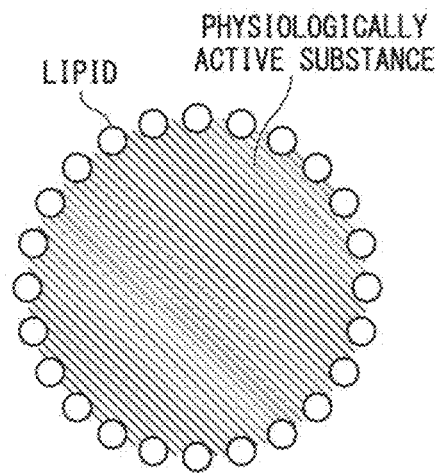
FIG. 5B shows an example of lipid nanoparticles.
Figure 5C:
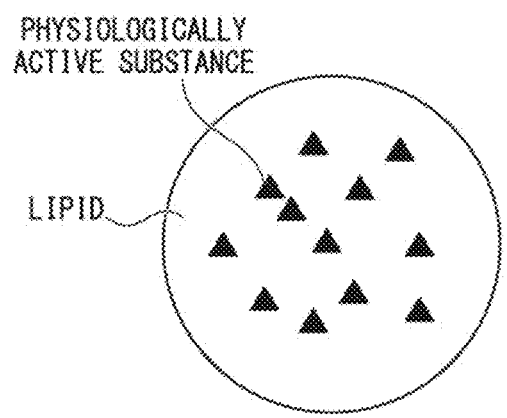
FIG. 5C shows an example of lipid nanoparticles.
Figure 6:
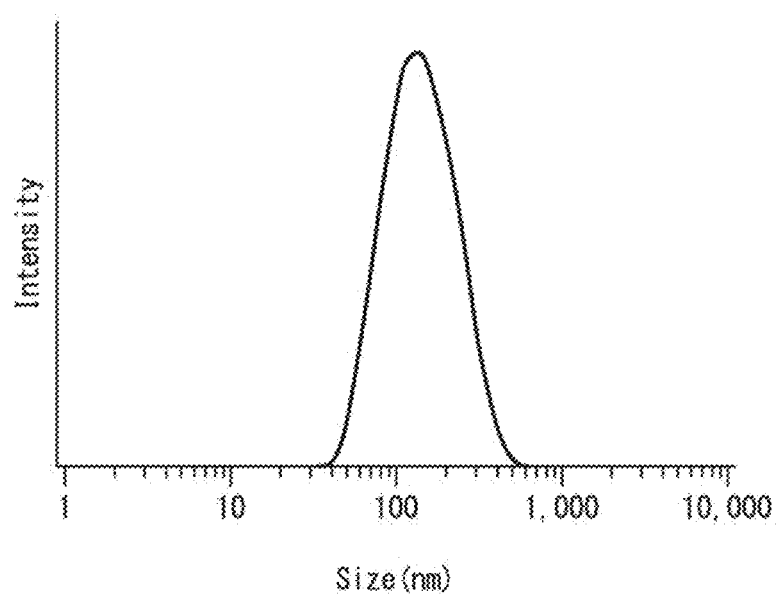
FIG. 6 is a graph showing the particle size distribution of lipid nanoparticles when lipid nanoparticle-containing microparticles of Example 1 are re-suspended in water.

FIGS. 5A to 5C are schematic cross-sectional views showing an example of lipid nanoparticles. In the examples of FIGS. 5A and 5B, lipid nanoparticles have lipids unevenly distributed in a single layer or multiple layers on the outermost surface. For example, liposomes have a lipid bilayer, and lipid emulsions have a lipid monolayer. FIG. 5C is an example of solid lipid nanoparticles and in which a solid lipid is used as a dispersion medium and a physiologically active substance is contained therein. A physiologically active substance is encapsulated into lipid nanoparticles. The physiologically active substance may be dispersed in a solid or liquid dispersion medium, and the interior of lipid nanoparticles may be composed of only a physiologically active substance.

In the particles of the present invention, when lipid nanoparticles encapsulating a physiologically active substance are dispersed and included in at least one type of substrate, and nano-sized lipid particles (lipid nanoparticles) are dispersed in the substrate for particle forms, it is possible to solve the problem of handling properties described in the background. In addition, the redispersibility of the lipid nanoparticles contained in the particles of the present invention is very good, which is advantageous in that it is not necessary to add a dispersion auxiliary agent and the like which have been variously examined in a freeze-drying method.

The particles of the present invention contain lipid nanoparticles containing a physiologically active substance dispersed in at least one type of substrate. When nano-sized lipid particles are particles dispersed in a substrate, it is possible to solve the problem of poor handling properties due to high adhesion and high cohesion specific to lipid nanoparticles.

(Substrate)

The substrate is a base material that constitutes particles. Therefore, it is preferably a solid at room temperature. The substrate is not particularly limited as long as it is a substance that does not adversely influence the physiologically active substance contained together therewith, and may be a low-molecular-weight substance or a high-molecular-weight substance, and since the particles of the present invention are preferably particles that are applied to a living body, the substrate is preferably a substance that is non-toxic to a living body. The low-molecular-weight substance is preferably a compound having a weight average molecular weight of less than 15.000. The high-molecular-weight substance is preferably a compound having a weight average molecular weight of 15,000 or more. As described above, the number of substrates may be one or two or more, and any of the substrates described below may be used in combination.

The substrate preferably contains a water soluble material. Since the substrate is water-soluble, lipid nanoparticles can be stably suspended in an aqueous solution in which the substrate is completely dissolved. When this suspension is formed into particles in a particle producing step to be described below, it is easy to prepare particles containing lipid nanoparticles in the substrate.

—Low-Molecular-Weight Substance—

The low-molecular-weight substances are not particularly limited, and can be appropriately selected according to the purpose, and examples thereof include lipids, sugars, cyclodextrins, amino acids, and organic acids. These may be used alone or two or more thereof may be used in combination.

—Lipids—

The lipids are not particularly limited, and can be appropriately selected according to the purpose, and examples thereof include medium-chain or long-chain monoglycerides, medium-chain or long-chain diglycerides, medium-chain or long-chain triglycerides, phospholipids, vegetable oils (for example, soybean oil, avocado oil, squalene oil, sesame oil, olive oil, corn oil, rapeseed oil, safflower oil, sunflower oil, etc.), fish oil, seasoning oil, water-insoluble vitamin, fatty acids, mixtures thereof, and derivatives thereof. These may be used alone or two or more thereof may be used in combination.

—Sugars—

The sugars are not particularly limited, and can be appropriately selected according to the purpose, and examples thereof include monosaccharides such as glucose, mannose, idose, galactose, fucose, ribose, xylose, lactose, sucrose, maltose, trehalose, turanose, raffinose, maltotriose, acarbose, cyclodextrins, amylose (starch), and cellulose, disaccharides, polysaccharides, sugar alcohols (polyols) such as glycerin, sorbitol, lactitol, maltitol, mannitol, xylitol, and erythritol, and derivatives thereof. These may be used alone or two or more thereof may be used in combination.

—Cyclodextrins—

The cyclodextrins are not particularly limited, and can be appropriately selected according to the purpose, and examples thereof include hydroxypropyl-β-cyclodextrin, β-cyclodextrin, γ-cyclodextrin, α-cyclodextrin, and cyclodextrin derivatives. These may be used alone or two or more thereof may be used in combination.

—Amino Acids—

The amino acids are not particularly limited, and can be appropriately selected according to the purpose, and examples thereof include valine, lysine, leucine, threonine, isoleucine, asparagine, glutamine, phenylalanine, aspartic acid, serine, glutamic acid, methionine, arginine, glycine, alanine, tyrosine, proline, histidine, cysteine, tryptophan, and derivatives thereof. These may be used alone or two or more thereof may be used in combination.

—Organic Acids—

The organic acids are not particularly limited, and can be appropriately selected according to the purpose, and examples thereof include adipic acid, ascorbic acid, citric acid, fumaric acid, gallic acid, glutaric acid, lactic acid, malic acid, maleic acid, succinic acid, tartaric acid, and derivatives thereof. These may be used alone or two or more thereof may be used in combination.

—High-Molecular-Weight Substance—

The high-molecular-weight substances are not particularly limited, and can be appropriately selected according to the purpose, and examples thereof include water-soluble celluloses, polyalkylene glycols, poly(meth)acrylamides, poly(meth)acrylic acids, poly(meth)acrylic acid esters, polyallylamines, polyvinylpyrrolidone, polyvinyl alcohols, polyvinyl acetate, biodegradable polyester, polyglycolic acid, polyamino acids, proteins such as gelatin and fibrin, polysaccharides and derivatives thereof. These may be used alone or two or more thereof may be used in combination. Here, (meth)acrylamide refers to acrylamide or methacrylamide, and (meth)acrylic acid refers to acrylic acid or methacrylic acid.

—Water-Soluble Cellulose—

The water-soluble celluloses are not particularly limited, and can be appropriately selected according to the purpose, and examples thereof include alkyl celluloses such as methyl cellulose and ethyl cellulose; hydroxyalkyl celluloses such as hydroxyethyl cellulose and hydroxypropyl cellulose; and hydroxyalkyl alkyl celluloses such as hydroxyethyl methyl cellulose, and hydroxypropyl methyl cellulose. These may be used alone or two or more thereof may be used in combination. Among these, hydroxypropyl cellulose or hydroxypropyl methyl cellulose is preferable, and hydroxypropyl cellulose is more preferable because it has high biocompatibility and high solubility in a solvent used for producing particles.

—Hydroxypropyl Cellulose—

Various hydroxypropyl cellulose products having different viscosities are commercially available from various companies, and any of them can be used for the substrate of the present invention. The viscosity of the aqueous solution (20° C.) containing 2 mass % of hydroxypropyl cellulose is not particularly limited, and can be appropriately selected according to the purpose, and is preferably 2.0 mPa·s (centipoise, cps) or more and 4,000 mPa·s (centipoise, cps) or less.

In addition, it is considered that the viscosity of hydroxypropyl cellulose depends on the weight average molecular weight, degree of substitution, and molecular weight of hydroxypropyl cellulose. The weight average molecular weight of hydroxypropyl cellulose is not particularly limited, and can be appropriately selected according to the purpose, and it is preferably 15,000 or more and 400,000 or less. Here, the weight average molecular weight can be measured using, for example, gel permeation chromatography (GPC).

Commercial products of hydroxypropyl cellulose are not particularly limited, and can be appropriately selected according to the purpose, and examples thereof include HPC-SSL and the like with a molecular weight of 15,000 or more and 30,000 or less and a viscosity of 2.0 mPa·s or more and 2.9 mPa·s or less. HPC-SL and the like with a molecular weight of 30,000 or more and 50,000 or less and a viscosity of 3.0 mPa·s or more and 5.9 mPa·s or less, HPC-L and the like with a molecular weight of 55,000 or more and 70.000 or less and a viscosity of 6.0 mPa·s or more and 10.0 mPa·s or less, HPC-M and the like with a molecular weight of 110,000 or more and 150,000 or less and a viscosity of 150 mPa·s or more and 400 mPa·s or less, and HPC-H and the like with a molecular weight of 250,000 or more and 400,000 or less and a viscosity of 1,000 mPa·s or more and 4,000 mPa·s or less (all commercially available from Nippon Soda Co., Ltd.). These may be used alone or two or more thereof may be used in combination. Among these, HPC-SSL with a molecular weight of 15,000 or more and 30,000 or less and a viscosity of 2.0 mPa·s or more and 2.9 mPa·s or less is preferable. Here, in the above commercial products, the molecular weight is measured using gel permeation chromatography (GPC), and the viscosity is measured using a 2 mass % aqueous solution (20° C.).

The content of hydroxypropyl celluloses is not particularly limited, and can be appropriately selected according to the purpose, and it is preferably 50 mass % or more, more preferably 50 mass % or more and 99 mass % or less, still more preferably 75 mass % or more and 99 mass % or less, and particularly preferably 80 mass % or more and 99 mass % or less with respect to the mass of the substrate.

—Polyalkylene Glycol—

The polyalkylene glycols are not particularly limited, and can be appropriately selected according to the purpose, and examples thereof include polyethylene glycol (PEG), polypropylene glycol, polybutylene glycol, and copolymers thereof. These may be used alone or two or more thereof may be used in combination.

—Poly(Meth)Acrylamide—

The poly(meth)acrylamides are not particularly limited, and can be appropriately selected according to the purpose, and examples thereof include polymers of monomers such as N-methyl(meth)acrylamide, N-ethyl(meth)acrylamide. N-propyl(meth)acrylamide. N-butyl(meth)acrylamide. N-benzyl(meth)acrylamide, N-hydroxyethyl(meth)acrylamide, N-phenyl(meth)acrylamide. N-tolyl(meth)acrylamide. N-(hydroxyphenyl)(meth)acrylamide, N-(sulfamoylphenyl)(meth)acrylamide, N-(phenylsulfonyl)(meth)acrylamide, N-(tolylsulfonyl)(meth)acrylamide. N,N-dimethyl(meth)acrylamide, N-methyl-N-phenyl(meth)acrylamide, and N-hydroxyethyl-N-methyl(meth)acrylamide. These monomers may be polymerized alone or two or more thereof may be polymerized in combination. In addition, these polymers may be used alone or two or more thereof may be used in combination.

—Poly(Meth)Acrylic Acid—

The poly(meth)acrylic acids are not particularly limited, and can be appropriately selected according to the purpose, and examples thereof include homopolymers such as polyacrylic acid and polymethacrylic acid, and copolymers such as acrylic acid-methacrylic acid copolymers. These may be used alone or two or more thereof may be used in combination.

—Poly(Meth)Acrylic Acid Ester—

The poly(meth)acrylic acid esters are not particularly limited, and can be appropriately selected according to the purpose, and examples thereof include polymers of monomers such as ethylene glycol di(meth)acrylate, diethylene glycol di(meth)acrylate, propylene glycol di(meth)acrylate, glycerol poly(meth)acrylate, polyethylene glycol (meth)acrylate, trimethylolpropane tri(meth)acrylate, pentaerythritol tetra(meth)acrylate, and 1,3-butylene glycol di(meth)acrylate. These monomers may be polymerized alone or two or more thereof may be polymerized in combination. In addition, these polymers may be used alone or two or more thereof may be used in combination.

—Polyallylamine—

The polyallylamines are not particularly limited, and can be appropriately selected according to the purpose, and examples thereof include diallylamine and triallylamine. These may be used alone or two or more thereof may be used in combination.

—Polyvinylpyrrolidone—

Commercial products can be used as polyvinylpyrrolidone. Commercial products of polyvinylpyrrolidone are not particularly limited, and can be appropriately selected according to the purpose, and examples thereof include Plasdone C-15 (commercially available from ISP TECHNOLOGIES), Kollidon VA64, Kollidon K-30, and Kollidon CL-M (all commercially available from KAWARLAL), and Kollicoat IR (commercially available from BASF). These may be used alone or two or more thereof may be used in combination.

—Polyvinyl Alcohol—

The polyvinyl alcohols am not particularly limited, and can be appropriately selected according to the purpose, and examples thereof include silanol-modified polyvinyl alcohols, carboxyl-modified polyvinyl alcohols, and acetoacetyl-modified polyvinyl alcohols. These may be used alone or two or more thereof may be used in combination.

—Polyvinyl Acetate—

The polyvinyl acetates are not particularly limited, and can be appropriately selected according to the purpose, and examples thereof include vinyl acetate-crotonic acid copolymers, and vinyl acetate-itaconic acid copolymers. These may be used alone or two or more thereof may be used in combination.

—Biodegradable Polyester—

The biodegradable polyesters are not particularly limited, and can be appropriately selected according to the purpose, and examples thereof include polylactic acid; poly-ε-caprolactone; succinate polymers such as polyethylene succinate, polybutylene succinate, and polybutylene succinate adipate; polyhydroxyalkanoates such as polyhydroxypropionate, polyhydroxybutyrate, and polyhydroxyparate, and polyglycolic acid. These may be used alone or two or more thereof may be used in combination. Among these, polylactic acid is preferable because it has high biocompatibility and allows the contained physiologically active substance to be eluted in a sustained release manner.

—Polylactic Acid—

The weight average molecular weight of polylactic acids is not particularly limited, and can be appropriately selected according to the purpose, and it is preferably 5,000 or more and 100,000 or less, more preferably 10,000 or more and 70,000 or less, still more preferably 10,000 or more and 50,000 or less, and particularly preferably 10,000 or more and 30,000 or less.

The content of polylactic acids is not particularly limited, and can be appropriately selected according to the purpose, and it is preferably 50 mass % or more, more preferably 50 mass % or more and 99 mass % or less, still more preferably 75 mass % or more and 99 mass % or less, and particularly preferably 80 mass % or more and 99 mass % or less with respect to the mass of the substrate.

—Polyglycolic Acid—

The polyglycolic acids are not particularly limited, and can be appropriately selected according to the purpose, and examples thereof include a lactic acid/glycolic acid copolymer which is a copolymer having structural units derived from lactic acid and structural units derived from glycolic acid, a glycolic acid/caprolactone copolymer which is a copolymer having structural units derived from glycolic acid and structural units derived from caprolactone and a glycolic acid/trimethylene carbonate copolymer which is a copolymer having structural units derived from glycolic acid and structural units derived from trimethylene carbonate. These may be used alone or two or more thereof may be used in combination. Among these, a lactic acid/glycolic acid copolymer is preferable because it has high biocompatibility, allows the contained physiologically active substance to be eluted in a sustained release manner and allows the contained physiologically active substance to be stored for a long time.

The weight average molecular weight of the lactic acid/glycolic acid copolymer is not particularly limited, and can be appropriately selected according to the purpose, and it is preferably 2,000 to 250,000, more preferably 2,000 to 100,000, still more preferably 3,000 to 50,000, and particularly preferably 5.000 to 10,000.

The molar ratio (L:G) between the structural unit (L) derived from lactic acid and the structural unit (G) derived from glycolic acid in the lactic acid/glycolic acid copolymer is not particularly limited, and can be appropriately selected according to the purpose, and it is preferably 1:99 to 99:1, more preferably 25:75 to 99:1, still more preferably 30:70 to 90:10, and particularly preferably 50:50 to 85:15.

The content of lactic acid/glycolic acid copolymers is not particularly limited, and can be appropriately selected according to the purpose, and it is preferably 50 mass % or more, more preferably 50 mass % or more and 99 mass % or less, still more preferably 75 mass % or more and 99 mass % or less, and particularly preferably 80 mass % or more and 99 mass % or less with respect to the mass of the substrate.

—Polyamino Acid—

The polyamino acids are not particularly limited, and can be appropriately selected according to the purpose. The polyamino acid may be a polymer obtained by arbitrarily combining the amino acids exemplified in the section of amino acids described above, and is preferably a polymer of single amino acids. Examples of preferable polyamino acids include amino acid homopolymers such as poly-α-glutamic acid, poly-γ-glutamic acid, polyaspartic acid, polylysine, polyarginine, polyornithine, and polyserine and copolymers thereof. These may be used alone or two or more thereof may be used in combination.

—Gelatin—

The gelatins are not particularly limited, and can be appropriately selected according to the purpose, and examples thereof include lime-treated gelatin, acid-treated gelatin, gelatin hydrolysate, gelatin enzyme dispersion, and derivatives thereof. These may be used alone or two or more thereof may be used in combination.

The natural dispersant polymers used in gelatin derivatives are not particularly limited, and can be appropriately selected according to the purpose, and examples thereof include proteins, polysaccharides, and nucleic acids. These include a copolymer composed of natural dispersant polymers or synthetic dispersant polymers. These may be used alone or two or more thereof may be used in combination.

A gelatin derivative refers to a gelatin derivatized by covalently bonding hydrophobic groups to gelatin molecules. Hydrophobic groups are not particularly limited, and can be appropriately selected according to the purpose, and examples thereof include polyesters such as polylactic acid, polyglycolic acid, and poly-ε-caprolactone; lipids such as cholesterol and phosphatidylethanolamine; alkyl groups, and aromatic groups containing a benzene ring; heteroaromatic groups or mixtures thereof.

The protein is not particularly limited as long as it does not influence the physiological activity of the physiologically active substance, and can be appropriately selected according to the purpose, and examples thereof include collagen, fibrin, and albumin. These may be used alone or two or more thereof may be used in combination.

The polysaccharides are not particularly limited, and can be appropriately selected according to the purpose, and examples thereof include chitin, chitosan, hyaluronic acid, alginic acid, starch, and pectin. These may be used alone or two or more thereof may be used in combination.

(Physiologically Active Substance)

The physiologically active substance is an active component used to exhibit a physiological effect in a living body. Examples of physiologically active substances include physiologically active substances contained in pharmaceutical compositions, physiologically active substances contained in functional foodstuffs, and physiologically active substances contained in functional cosmetics. These may be used alone or two or more thereof may be used in combination.

—Physiologically Active Substance Contained in Pharmaceutical Composition—

The physiologically active substance contained in a pharmaceutical composition is not particularly limited, and can be appropriately selected according to the purpose, and examples thereof include nucleic acids, polypeptides containing proteins, carbohydrates, lipids, and low-molecular-weight compounds. These may be used alone or two or more thereof may be used in combination.

—Nucleic Acid—

Nucleic acids typically include DNA, RNA, combinations thereof, and the like, and a part or all of these sequences may be substituted with chemically modified nucleic acids that have been chemically modified. In addition, nucleic acids also include chemically synthesized nucleic acid analogues such as peptide nucleic acid (PNA) and morpholino antisense oligo. For example, when the object is to enhance target gene expression, as nucleic acids, for example, mRNA, which is a transcriptional product of target genes, is an exemplary example, and when the object is to minimize target gene expression, as nucleic acids, for example, antisense nucleic acids for transcriptional products of target genes or a part thereof, nucleic acids having ribozyme activity of specifically cleaving transcriptional products of target genes, short-chain nucleic acids having a function of inhibiting target gene expression through an RNAi effect, and locked nucleic acids modified from microRNA (miRNA), aptamers, and oligonucleotides are exemplary examples.

—Polypeptide—

Polypeptides are polymers composed of a plurality of amino acids, and among these, a polypeptide having a higher-order structure and exhibiting a function derived from such a higher-order structure is specifically called a protein. Polypeptides include both those that are not modified from their naturally occurring state and those that are modified. Examples of modifications include acetylation, acylation, ADP-ribosylation, amidation, covalent bonding of flavin, covalent bonding of heme moieties, covalent bonding of nucleotides or nucleotide derivatives, covalent bonding of lipids or lipid derivatives, covalent bonding of phosphatidylinositol, cross-linking, cyclization, forming of disulfide bonds, demethylation, forming of covalent cross-linking, forming of cystine, forming of pyroglutamate, formylation, γ-carboxylation, glycosylation, GPI anchor formation, hydroxylation, iodination, methylation, myristoylation, oxidation, a protein degradation treatment, phosphorylation, prenylation, racemization, selenoylation, sulfation, transfer RNA-mediated addition of amino acids to proteins such as arginylation, and ubiquitination. When the object is to inhibit or minimize the function of target proteins, examples of proteins include target protein mutants having a dominant negative property with respect to target proteins and antibodies that bind to target proteins. The antibodies may be polyclonal antibodies or monoclonal antibodies as long as they bind to target proteins, and may be antibodies having multispecificity such as bispecific antibodies or trispecific antibodies. Antibodies may be derived from any animal species as long as a physiological effect is exhibited, and are preferably human antibodies, human chimeric antibodies or humanized antibodies. In the present invention, the "antibodies" are typically immunoglobulin molecules such as IgG, IgE, IgM, IgA, and IgD, and also include antibody fragments thereof having an antigen binding region (for example, F(ab')2 fragments, Fab' fragments, Fab fragments, Fv fragments, rIgG fragments, single-chain antibodies, etc.) and modified antibodies (labeled antibodies, etc.) as long as they can bind to a specific antigen. Here, other forms of proteins may include, for example, enzymes. Examples of enzymes include hydrolases, phosphorylases, dephosphorylases, transferases, oxidoreductases, lyases, isomerases, and synthases.

—Carbohydrates—

Examples of carbohydrates include monosaccharides, disaccharides, oligosaccharides, and polysaccharides. In addition, carbohydrates also include complex carbohydrates in which these carbohydrates are covalently bonded to proteins, lipids or the like, and glucosides in which aglycones such as alcohols, phenols, saponins, and pigments are bonded to reducing groups of sugars.

—Lipid—

Examples of lipids include simple lipids, complex lipids, and derived lipids.

—Low-Molecular-Weight Compound—

Low-molecular-weight compounds generally include natural or artificial substances having a molecular weight of several hundreds to several thousands. In addition, the low-molecular-weight compounds include substances corresponding to the above poorly water-soluble substances, substances corresponding to the above water-soluble substances and the like. Here, the low-molecular-weight compound may be in any form such as a salt or hydrate as long as it functions as a physiologically active substance.

The poorly water-soluble substances are not particularly limited, and can be appropriately selected according to the purpose, and examples thereof include griseofulvin, itraconazole, norfloxacin, tamoxifen, cyclosporine, glibenclamide, troglitazone, nifedipine, phenacetin, phenytoin, digitoxin, nilvadipine, diazepam, chloramphenicol, indomethacin, nimodipine, dihydroergotoxine, cortisone, dexamethasone, naproxen, tulobuterol, beclomethasone propionate, fluticasone propionate, pranlukast, tranilast, loratadine, tacrolimus, amprenavir, bexarotene, calcitriol, clofazimine, digoxin, doxercalciferol, dronabinol, etoposide, isotretinoin, lopinavir, ritonavir, progesterone, saquinavir, sirolimus, tretinoin, amphotericin, fenoldopam, melphalan, paricalcitol, propofol, voriconazole, ziprasidone, docetaxel, haloperidol, lorazepam, teniposide, testosterone, valrubicin, gefitinib, erlotinib, osimertinib, bosutinib, vandetanib, alectinib, lorlatinib, abemaciclib, tyrphostin AG494, sorafenib, dasatinib, lapatinib, imatinib, motesanib, lestaurtinib, tandutinib dorsomorphin, axitinib, and 4-benzyl-2-methyl-1,2,4-thiadiazolidine-3,5-dione. These may be used alone or two or more thereof may be used in combination.

The water-soluble substances are not particularly limited, and can be appropriately selected according to the purpose, and examples thereof include abacavir, acetaminophen, aciclovir, amiloride, amitriptyline, antipyrine, atropine, buspirone, caffeine, captopril, chloroquine, chlorpheniramine, cyclophosphamide, diclofenac, desipramine, diazepam, diltiazem, diphenhydramine, disopyramide, doxin, doxycycline, enalapril, ephedrine, ethambutol, ethinylestradiol, fluoxetine, imipramine, glucose, ketorol, ketoprofen, labetalol, L-dopa, levofloxacin, metoprolol, metronidazole, midazolam, minocycline, misoprostol, metformin, nifedipine, phenobarbital, prednisolone, promazine, propranolol, quinidine, rosiglitazone, salicylic acid, theophylline, valproic acid, verapamil, and zidovudine. These may be used alone or two or more thereof may be used in combination.

—Physiologically Active Substance Contained in Functional Foodstuff—

The physiologically active substance contained in functional foodstuffs is not particularly limited, and can be appropriately selected according to the purpose, and examples thereof include vitamin A, vitamin D, vitamin E, lutein, zeaxanthin, lipoic acid, flavonoid, and fatty acids. These may be used alone or two or more thereof may be used in combination.

Examples of fatty acids include omega-3 fatty acids and omega-6 fatty acids.

—Physiologically Active Substance Contained in Functional Cosmetic—

The physiologically active substance contained in functional cosmetics is not particularly limited, and can be appropriately selected according to the purpose, and examples thereof include alcohols, fatty alcohols, and polyols, aldehydes, alkanolamines, alkoxylated alcohols (for example, polyethylene glycol derivatives such as alcohols and fatty alcohols), alkoxylated amides, alkoxylated amines, alkoxylated carboxylic acids, amides containing salts (for example, ceramides, etc.), amines, amino acids containing salts and alkyl-substituted derivatives, esters, alkyl-substituted and acyl derivatives, polyacrylic acids, acrylamide copolymers, adipic acid copolymers, amino silicones, biological polymers and derivatives thereof, butylene copolymers, carbohydrate (for example, polysaccharides, chitosan, derivatives thereof, etc.), carboxylic acids, carbomers, esters, ethers, and polymer ethers (for example, PEG derivatives, PPG derivatives, etc.), glyceryl esters and derivatives thereof, halogen compounds, heterocycle compounds containing salts, hydrophilic colloids and derivatives containing salts and rubber (for example, cellulose derivatives, gelatin, xanthan gum, natural rubbers, etc.), imidazolines, inorganic substance (clay, $TiO_2$, ZnO, etc.), ketones (for example, camphor, etc.), isethionic acids, lanolin and derivatives thereof, organic salts, phenols containing salts (for example, parabens, etc.), phosphorus compounds (for example, phosphoric acid derivatives, etc.), polyacrylates and acrylate copolymers, proteins and enzyme derivatives (for example, collagen, etc.), synthetic polymers containing salts, siloxanes and silanes, sorbitan derivatives, sterols, sulfonic acids and derivatives thereof, and waxes. These may be used alone or two or more thereof may be used in combination.

As described above, the physiologically active substance preferably has a property of changing physiological activity according to heating, cooling, or external stress. When such a physiologically active substance is contained in the particles of the present invention, the decrease in the degree of physiological activity is minimized in the produced particles. Therefore, based on the perspective that the decrease in the degree of physiological activity can be further minimized, when a physiologically active substance whose physiological activity is easily changed according to heating, cooling, or external stress is used as the physiologically active substance contained in the particles of the present invention, the effects of the present invention are significantly exhibited. Specifically, the physiologically active substance is preferably a physiologically active substance contained in a pharmaceutical composition, more preferably at least one selected from among proteins and nucleic acids, and still more preferably at least one selected from among antibodies and enzymes.

(Lipid)

Lipids are unevenly distributed in a single layer or multiple layers on the outermost surface of nanoparticles. The type of lipid can be appropriately changed depending on desired properties. Specific examples thereof include phospholipids, saturated fatty acids, unsaturated fatty acids and the like, but the present invention is not limited thereto as long as they form nanoparticles.

More specifically, for example, phosphatidylcholine, phosphatidylethanolamine, dimyristylphosphatidylcholine, dipalmitoylphosphatidylcholine, distearylphosphatidylcholine, phosphatidylglycerol, phosphatidylserine, lauric acid, tridecylic acid, myristic acid, pentadecylic acid, palmitic acid, margaric acid, stearic acid, nonadecylic acid, arachidic acid, linoleic acid, docosahexaenoic acid, oleic acid and derivatives thereof are exemplary examples.

(Physical Properties of Particle)

Characteristic physical properties of the particles of the present invention include, for example, a physiological activity rate, a particle size distribution, and a particle size.

—Physiological Activity Rate—

In this specification, "physiological activity rate" refers to a ratio of the degree of physiological activity in particles produced from the material to the degree of physiological activity in the material used for particle production ({degree of physiological activity after particle production/degree of physiological activity before particle production}×100). In addition, the "degree of physiological activity" represents a measured value obtained when the physiological activity of the physiologically active substance is quantitatively measured. Here, "quantitatively measuring" is not limited to a direct method of quantitatively measuring the degree of physiological activity itself, and for example, a relative quantitative measurement method of measuring the degree of physiological activity by comparing it with a predetermined reference may be used.

—Particle Size Distribution—

The particles of the present invention preferably have a property of a narrow particle size distribution. Specific examples of an index indicating the narrowness of such a particle size distribution include Relative Span Factor (R. S. F) and the volume average particle size (Dv)/number average particle size (Dn), and for example, the R. S. F, is preferably $0 \leq (R. S. F) \leq 1.2$, and the volume average particle size (Dv)/number average particle size (Dn) is preferably 1.00 or more and 1.50 or less. When the particle size distribution is within the above range, the proportion of particles corresponding to coarse particles is reduced when viewed from the desired particle size. Therefore, even when particles should be sterilized by filtration before use, such as when particles are contained in a pharmaceutical composition, sterilization by filtration can be performed simply and efficiently without clogging the filtration sterilization filter. In addition, when the particle size is made uniform, the content of the physiologically active substance and the substrate in each particle and the surface area of each particle become uniform. Therefore, the amount of the physiologically active substance eluted from each particle becomes uniform, and particles which allow the physiologically active substance to be sustained-released in a highly controllable manner can be provided. In addition, when the particle size is made uniform, it is possible to minimize the generation of particles having a small particle size composed of a single physiologically active substance that is not included in the substrate, and it is possible to provide particles having a sustained release property with minimized initial burst.

—Relative Span Factor (R. S. F)—

In this specification, "Relative Span Factor (R. S. F)" is defined as (D90–D10)/D50. D90 represents a cumulative of 90 volume % from the small particle side of the cumulative particle size distribution, D50 represents a cumulative of 50 volume % from the small particle side of the cumulative particle size distribution, and D10 represents a cumulative of 10 volume % from the small particle side of the cumulative particle size distribution. (R. S. F) is preferably 0<(R. S. F)≤1.2, more preferably 0<(R. S. F)≤1.0, and still more preferably 0<(R. S. F)≤0.6.

The method of measuring (R. S. F) includes, for example, a measurement method using a concentrated system analyzer ("FPAR-1000," commercially available from Otsuka Electronics Co., Ltd.) according to dynamic light scattering.

—Volume Average Particle Size (Dv)/Number Average Particle Size (Dn)—

The volume average particle size (Dv)/number average particle size (Dn) is a value obtained by dividing the volume average particle size (Dv) by the number average particle size (Dn). The volume average particle size (Dv)/number average particle size (Dn) is preferably 1.00 or more and 1.50 or less, and more preferably 1.00 or more and 1.20 or less.

The method of measuring the volume average particle size (Dv) and the number average particle size (Dn) includes, for example, a measurement method using a laser diffraction/scattering type particle size distribution measurement device (device name: Microtrac MT3000II, commercially available from MicrotracBel Corp.).

—Particle Size—

Regarding the volume average particle size (Dv) of the particles, as long as it is a size at which the particle can contain lipid nanoparticles therein, an optimal value can be appropriately selected according to the purpose or the like. Lipid nanoparticles generally have a volume average particle size of about 10 to 300 nm. Therefore, the lower limit value of the volume average particle size of the particles of the present invention may be larger than the above value, and examples thereof include 0.5 μm, 1 μm, 2 μm, 3 μm, 4 μm, and 5 μm. In addition, the upper limit value of the volume average particle size is not particularly limited as long as it can be produced as particles, and it can be appropriately selected according to the production efficiency, purpose or the like, and in consideration of handling properties of particles, and for example, 300 m, 250 μm, 200 μm, 150 μm, and 100 μm are exemplary examples. Therefore, the range of the volume average particle size of the particles in this specification is, for example, 0.5 μm or more and 100 μm or less. The above lower limit value and upper limit value can be combined arbitrarily.

When the volume average particle size (Dv) is 0.5 μm or more and 100 μm or less, a sufficient amount of the physiologically active substance can be retained, and for example, it is possible to produce particles which allow the physiologically active substance to be sustained-released over a long time. Here, the volume average particle size (Dv) is more preferably 1 μm or more and 50 μm or less, still more preferably 1 m or more and 25 μm or less, and particularly preferably 1 μm or more and 10 μm or less.

The method of measuring the volume average particle size (Dv) of particles includes, for example, a measurement method using a concentrated system analyzer ("FPAR-1000," commercially available from Otsuka Electronics Co., Ltd.) according to dynamic light scattering and a measurement method using a laser diffraction/scattering type particle size distribution measurement device (device name: Microtrac MT3000II, commercially available from MicrotracBel Corp.).

The particles of the present invention can be used in, for example, pharmaceutical compositions, functional foodstuffs, and functional cosmetics, by combining other components such as a dispersant and an additive as necessary. In addition, the particles may be functional particles according to various purposes. The functional fine particles are not particularly limited, and can be appropriately selected according to the purpose, and examples thereof include immediate release particles, sustained-release particles, pH-dependent release particles, pH-independent release particles, enteric coating particles, release control coating particles, and nanocrystal-containing particles.

—Pharmaceutical Composition—

The pharmaceutical composition contains the particles of the present invention, and as necessary, additive substances for formulations and the like. The additive substances are not particularly limited, and can be appropriately selected according to the purpose. Examples of additive substances include excipients, flavoring agents, disintegrants, fluidizers, adsorbents, lubricants, flavoring agents, surfactants, fragrances, coloring agents, antioxidants, masking agents, antistatic agents, and wetting agents. These may be used alone or two or more thereof may be used in combination.

—Excipient—

The excipients are not particularly limited, and can be appropriately selected according to the purpose, and examples thereof include lactose, sucrose, mannitol, glucose, fructose, maltose, erythritol, maltitol, xylitol, palatinose, trehalose, sorbitol, crystalline cellulose, talc, anhydrous silicic acid, anhydrous calcium phosphate, precipitated calcium carbonate, and calcium silicate. These may be used alone or two or more thereof may be used in combination.

—Flavoring Agent—

The flavoring agents are not particularly limited, and can be appropriately selected according to the purpose, and examples thereof include L-menthol, white sugar. D-sorbitol, xylitol, citric acid, ascorbic acid, tartaric acid, malic acid, aspartame, acesulfame potassium, thaumatin, saccharin sodium, dipotassium glycyrrhizin, sodium glutamate, sodium 5'-inosinate, and sodium 5'-guanylate. These may be used alone or two or more thereof may be used in combination.

—Disintegrant—

The disintegrants are not particularly limited, and can be appropriately selected according to the purpose, and examples thereof include low-substituted hydroxypropyl cellulose, carmellose, carmellose calcium, carboxymethyl starch sodium, croscarmellose sodium, crospovidone, hydroxypropyl starch, and cornstarch. These may be used alone or two or more thereof may be used in combination.

—Fluidizer—

The fluidizers are not particularly limited, and can be appropriately selected according to the purpose, and examples thereof include light anhydrous silicic acid, hydrated silicon dioxide, and talc. These may be used alone or two or more thereof may be used in combination.

Commercial products can be used as light anhydrous silicic acid. Commercial products of light anhydrous silicic acid are not particularly limited, and can be appropriately selected according to the purpose, and examples thereof include Adsolider 101 (commercially available from Freund Corp.: average pore size: 21 nm).

—Adsorbent—

Commercial products can be used as adsorbents. Commercial products of adsorbents are not particularly limited, and can be appropriately selected according to the purpose, and examples thereof include product name: Carplex (registered trademark, component name: synthetic silica, commercially available from DSL. Japan Co., Ltd.), product name: Aerosil (registered trademark, commercially available from Nippon Aerosil Co., Ltd.) 200 (component name: hydophilic fumed silica), product name: SYLYSIA (registered trademark, component name: amorphous silicon dioxide, commercially available from Fuji Silysia Chemical Ltd.), and product name: ALCAMACR (registered trademark, component name: synthetic hydrotalcite, commercially available from Kyowa Chemical Industry Co., Ltd.). These may be used alone or two or more thereof may be used in combination.

—Lubricant—

The lubricants are not particularly limited, and can be appropriately selected according to the purpose, and examples thereof include magnesium stearate, calcium stearate, sucrose fatty acid ester, sodium stearyl fumarate, stearic acid, polyethylene glycol, and talc. These may be used alone or two or more thereof may be used in combination.

—Flavoring Agent—

The flavoring agents are not particularly limited, and can be appropriately selected according to the purpose, and examples thereof include trehalose, malic acid, maltose, potassium gluconate, anise essential oil, vanilla essential oil, and cardamom essential oil. These may be used alone or two or more thereof may be used in combination.

—Surfactant—

The surfactants are not particularly limited, and can be appropriately selected according to the purpose, and examples thereof include lecithin and polysorbates such as polysorbate 80; polyoxyethylene/polyoxypropylene copolymers; and sodium lauryl sulfate. These may be used alone or two or more thereof may be used in combination.

—Fragrance—

The fragrances are not particularly limited, and can be appropriately selected according to the purpose, and examples thereof include lemon oil, orange oil, and peppermint oil. These may be used alone or two or more thereof may be used in combination.

—Coloring Agent—

The coloring agents are not particularly limited, and can be appropriately selected according to the purpose, and examples thereof include titanium oxide, food yellow No. 5, food blue No. 2, iron sesquioxide, and yellow iron sesquioxide. These may be used alone or two or mom thereof may be used in combination.

—Antioxidant—

The antioxidants are not particularly limited, and can be appropriately selected according to the purpose, and examples thereof include sodium ascorbate. L-cysteine, sodium sulfite, and vitamin E. These may be used alone or two or more thereof may be used in combination.

—Masking Agent—

The masking agents are not particularly limited, and can be appropriately selected according to the purpose, and examples thereof include titanium oxide. These may be used alone or two or more thereof may be used in combination.

—Antistatic Agent—

The antistatic agents are not particularly limited, and can be appropriately selected according to the purpose, and examples thereof include talc and titanium oxide. These may be used alone or two or more thereof may be used in combination.

—Wetting Agent—

The wetting agents are not particularly limited, and can be appropriately selected according to the purpose, and examples thereof include polysorbate 80, sodium lauryl sulfate, sucrose fatty acid ester, macrogol, and hydroxypropyl cellulose (PC). These may be used alone or two or more thereof may be used in combination.

The pharmaceutical composition formulations are not particularly limited, and can be appropriately selected according to the purpose, and examples thereof include large intestine delivery formulations, lipid microsphere formulations, dry emulsion formulations, self-emulsifying formulations, dry syrups, powder formulations for nasal administration, powder formulations for pulmonary administration (powder inhalant), wax matrix formulations, hydrogel formulations, polymer micelle formulations, mucosal adhesive formulations, gastric floating formulations, liposome formulations, and solid dispersion formulations. These may be used alone or two or more thereof may be used in combination.

Examples of dosage forms of the pharmaceutical composition include tablets, capsules, suppositories, and other solid dosage forms; aerosols for intranasal or pulmonary administration; and liquid agents such as injection agents, intraocular agents, intraaural agents, and oral agents. When prepared as a liquid agent, it may be provided as a powder and dissolved in a solvent such as water before use and prepared just before use.

The administration route of the pharmaceutical composition is not particularly limited, and can be appropriately selected according to the purpose, and examples thereof include oral administration, nasal administration, rectal administration, vaginal administration, subcutaneous administration, intravenous administration, and pulmonary administration. Among these, intravenous administration, and pulmonary administration are preferable.

—Functional Foodstuff—

Functional foodstuffs contain the particles of the present invention and a foodstuff, and contain, as necessary, other additive substances.

The foodstuffs are not particularly limited, and can be appropriately selected according to the purpose, and examples thereof include frozen desserts, noodles, confectioneries, fishery products, fishery and livestock processed foodstuffs, dairy products, oils and fats, oil and fat processed foodstuffs, seasonings, retort pouch foodstuffs, health foodstuffs, and dietary supplements.

—Functional Cosmetic—

The functional cosmetic contains the particles of the present invention and a cosmetic, and contain, as necessary, other additive substances.

The cosmetics are not particularly limited, and can be appropriately selected according to the purpose, and examples thereof include skin care cosmetics, make-up cosmetics, hair care cosmetics, body care cosmetics, and fragrance cosmetics.

(Particle Producing Method and Producing Device)

A method for producing particles of the present invention includes a granulating and drying step in which particles are granulated by removing a solvent from a suspension containing a substrate, lipid nanoparticles containing a physiologically active substance, and a solvent (which may hereinafter be referred to as a "particle composition liquid"), and includes, as necessary, other steps.

The method for producing lipid nanoparticles varies depending on the type of lipid nanoparticles to be produced. For example, a lipid emulsion can be produced by a mixed emulsification or extrusion method, and solid lipid nanoparticles can be produced by a solvent diffusion method or the like, but the present invention is not limited thereto.

A device for producing particles of the present invention includes a droplet discharging unit configured to discharge a suspension containing a substrate, lipid nanoparticles containing a physiologically active substance, and a solvent as droplets, and a granulation unit configured to granulate particles by removing the solvent from the droplets, and includes, as necessary, other units.

In this specification, "removal" means that the solvent contained in the liquid phase is removed from the liquid phase, but it is not limited to the case in which the solvent contained in the liquid phase is completely removed, but includes a case in which the solvent contained in the liquid phase may remain as long as particles can be granulated. In addition, in this specification, "removal" is not particularly limited as long as the solvent contained in the liquid phase is removed from the liquid phase, and includes, for example, a case in which a liquid phase is brought into contact with another liquid phase, and the solvent contained in the liquid phase is diffused in the other liquid phase (hereinafter referred to as "drying in liquid"), and a case in which, in a gas or vacuum, a solvent contained in a liquid phase is vaporized from the liquid phase (hereinafter referred to as "drying in air").

Hereinafter, the particle producing method and producing device will be described in more detail, but the particle producing method and producing device are not limited to the following embodiments.

A method for producing particles in an embodiment (drying in air) includes a droplet discharging step in which droplets containing a substrate, lipid nanoparticles containing a physiologically active substance having physiological activity, and a solvent are discharged into a gas medium, and a granulating and drying step in which the solvent is vaporized from the droplets, the solvent contained in the droplets is removed, and the particles are granulated, and includes, as necessary, other steps.

As in the embodiment, a plurality of methods are conventionally known as dry granulation methods for granulating particles in a gas medium.

For example, in-air pulverization methods such as a method of obtaining pulverized particles having a small particle size by cooling a melt-kneaded product obtained by melt-kneading and uniformly dispersing a particulate material and then performing pulverizing using a pulverizer, and a method of obtaining pulverized particles having a small particle size by freeze-drying a liquid containing a particulate material and then performing pulverizing using a pulverizer is an exemplary example.

In addition, a spray drying method such as a method of obtaining spray particles having a small particle size by spraying a liquid containing a particulate material into a gas medium and drying it is an exemplary example. Here, examples of spraying methods include a pressurized nozzle type method of pressurizing a liquid and spraying it from the nozzle and a disk type method of sending a liquid to a disk that rotates at a high speed and performing scattering with a centrifugal force.

Among these, a spray drying method is preferable because particles containing lipid nanoparticles are produced efficiently. When the spray drying method is applied, drying and a granulation process can be performed at the same time. The spraying method is not particularly limited as long as it is a spray drying method, but a discharge method by vibration using a piezo driving force to be described below is particularly preferable in consideration of particle uniformity and external stress and thermal energy for lipid nanoparticles and physiologically active substances.

—Droplet Discharging Step—

The droplet discharging step in the embodiment is a step of discharging droplets containing a substrate, lipid nanoparticles containing a physiologically active substance having physiological activity, and a solvent into a gas medium.

As an example of the droplet discharging step in the embodiment, a method of discharging a liquid (suspension) containing a substrate, lipid nanoparticles containing a physiologically active substance, and a solvent as droplets by vibration will be described again. The method of discharging droplets can be used without particular limitation, and examples thereof include discharge methods by vibration using an atomizer, a spray nozzle, a piezo or the like as a driving force. Among these, particularly, a discharge method by vibration using a piezo driving force is preferably used because particles having a uniform particle size are obtained. The method of performing discharging by applied vibration is not particularly limited, and for example, the following methods are exemplary examples. Hereinafter, respective methods will be described.

(a) A method using a volume changing unit configured to change the volume of a liquid accommodating unit using vibration.

(b) A method using a constriction generating unit configured to release a liquid from a plurality of discharge holes provided in a liquid accommodating unit while applying vibration to the liquid accommodating unit and make the liquid into droplets from a columnar shape through a constriction state.

(c) A method using a nozzle vibrating unit configured to vibrate a thin film on which a nozzle is formed.

The volume changing unit is not particularly limited as long as it can change the volume of the liquid accommodating unit, and can be appropriately selected according to the purpose, and examples thereof include a piezoelectric element (sometimes referred to as a "piezo element") that expands and contracts when a voltage is applied.

Examples of constriction generating units include a unit using the technique described in Japanese Unexamined Patent Application, First Publication No. 2007-199463. Japanese Unexamined Patent Application, First Publication No. 2007-199463 describes a unit configured to release a liquid from a plurality of nozzle holes provided in a liquid accommodating unit while applying vibration to the liquid accommodating unit by a vibration unit using a piezoelectric element in contact with a part of the liquid accommodating unit and make the liquid into droplets from the columnar shape through a constriction state.

Examples of nozzle vibrating units include a unit using the technique described in Japanese Unexamined Patent Application, First Publication No. 2008-292976. Japanese Unexamined Patent Application. First Publication No. 2008-292976 describes a unit configured to release a liquid from a plurality of nozzle holes and make it into droplets using a thin film formed with a plurality of nozzles provide in a liquid accommodating unit and a piezoelectric element disposed on the surroundings inside a deformable region of the thin film and causing the thin film to vibrate.

A piezoelectric element is generally used as a unit configured to generate vibration. The piezoelectric element is not particularly limited, and the shape, the size, and the material can be appropriately selected, and for example, a piezoelectric element used in a conventional inkjet discharge system can be suitably used.

The shape and size of the piezoelectric element are not particularly limited, and can be appropriately selected according to the shape of the discharge hole or the like.

The material of the piezoelectric element is not particularly limited, and can be appropriately selected according to the purpose, and examples thereof include piezoelectric ceramics such as lead zirconate titanate (PZT), piezoelectric polymers such as polyvinylidene fluoride (PVDF), and single crystals such as crystals, $LiNbO_3$, $LiTaO_3$, and $KNbO_3$.

The discharge hole is not particularly limited, and can be appropriately selected according to the purpose, and examples thereof include an opening provided in a nozzle plate or the like.

The cross-sectional shape and size of the discharge hole can be appropriately selected. The cross-sectional shape of the discharge hole is not particularly limited, and can be appropriately selected according to the purpose, and examples thereof include (1): a tapered shape in which the opening diameter becomes smaller from the inside (the side of the liquid accommodating unit) to the outside (the side from which the liquid is discharged), (2): a shape in which the opening diameter becomes narrower from the inside (the side of the liquid accommodating unit) to the outside (the side from which the liquid is discharged) while the round shape is maintained. (3): a shape in which the opening diameter becomes narrower from the inside (the inside of the liquid accommodating unit) to the outside (the side from which the liquid is discharged) while a certain nozzle angle is maintained, and (4): a combination of the shape of (1) and the shape of (2). Among these, the shape of (3) is preferable because the pressure applied to the liquid in the discharge hole is maximized.

The nozzle angle in the shape of (3) is not particularly limited, and can be appropriately selected according to the purpose, and it is preferably 60° or more and 90° or less. When the nozzle angle is 600 or more and 900 or less, droplet discharge can be stabilized.

The size of the discharge hole is not particularly limited, and can be appropriately selected according to the purpose, and for example, the diameter is preferably less than 1,000 μm, more preferably 1.0 μm or more and less than 1.000 μm, still more preferably 1.0 μm or more and 500 μm or less, and particularly preferably 1.0 μm or more and 50 μm or less. Here, when the shape of the discharge hole is not a perfect circle, the diameter of a perfect circle having the same area as the area of the discharge hole is used.

The particle composition liquid contains a substrate, lipid nanoparticles containing a physiologically active substance having physiological activity, and a solvent, but for the substrate and lipid nanoparticles containing a physiologically active substance contained in the liquid (suspension), various materials similar to the substrate, lipid and physiologically active substance contained in the particles can be used, and thus a description thereof will be omitted and only the solvent will be described.

—Solvent—

The solvent is a liquid in which the substrate is dissolved. Examples of solvents include water, aliphatic halogenated hydrocarbons (for example, dichloromethane, dichloroethane, chloroform, etc.), alcohols (for example, methanol, ethanol, propanol, etc.), ketones (for example, acetone, methyl ethyl ketone, etc.), ethers (for example, diethyl ether, dibutyl ether, 1,4-dioxane, etc.), aliphatic hydrocarbons (for example, n-hexane, cyclohexane, n-heptane, etc.), aromatic hydrocarbons (for example, benzene, toluene, xylene, etc.), organic acids (for example, acetic acid, propionic acid, etc.), esters (for example, ethyl acetate, etc.), amides (for example, dimethylformamide, dimethylacetamide, etc.), and mixed solvents thereof. These may be used alone or two or more thereof may be used in combination. Among these, it is preferable to use water in order to obtain a stable lipid nanoparticle suspension.

The content of the solvent with respect to the mass of the particle composition liquid is preferably 70 mass % or more and 99.5 mass % or less and more preferably 90 mass % or more and 99 mass % or less. When the content is 70 mass % or more and 99.5 mass % or less, the production stability is improved in terms of the solubility of the particulate material and the liquid viscosity.

The viscosity of the particle composition liquid is not particularly limited, and can be appropriately selected according to the purpose, and it is preferably 0.5 mPa·s or more and 15.0 mPa·s or less and more preferably 0.5 mPa·s or more and 10.0 mPa·s or less. Here, the viscosity can be measured using, for example, a viscoelasticity measuring device (device name: MCR rheometer, commercially available from AntonPaar) under conditions of 25° C. and a shear rate of 10 $s^{-1}$. The viscosity of the liquid is preferably 0.5 mPa·s or more and 15.0 mPa·s or less because suitable discharging can be performed in the above unit for discharging droplets.

The surface tension of the particle composition liquid is not particularly limited, and can be appropriately selected according to the purpose, and it is preferably 10 mN/m or more and 60 mN/m or less and more preferably 20 mN/m or more and 50 mN/m or less. Here, the surface tension can be measured using, for example, a handy surface tension meter (device name: PocketDyne, commercially available from KRUSS) under conditions of 25° C. and a lifetime of 1,000 ms according to a maximum foaming pressure method. The surface tension of the liquid is preferably 0.5 mPa·s or more and 15.0 mPa·s or less because suitable discharging can be performed in the above unit for discharging droplets.

—Granulating and Drying Step—

The granulating and drying step in the embodiment is a step in which the solvent is vaporized from the droplets, the solvent contained in the droplets is removed, and the particles are granulated. Here, the granulating and drying step is performed in a gas medium, and specifically, is preferably performed when droplets discharged into the gas medium in the droplet discharging step fly in the gas medium. According to granulation in this step, the form of particles can be a solid dispersion, and specifically, particles in the form in which lipid nanoparticles containing a physiologically active substance are dispersed in a substrate can be produced.

Unlike the conventional spray drying method, it is not necessary to dry particles produced by this method by heating or cooling, and in particular, it is advantageous for forming particles containing a physiologically active substance whose physiological activity is easily changed by heating or cooling. In addition, it is possible to discharge droplets having an approximately uniform size while performing control so that the droplets do not coalesce, and perform granulation by vaporizing the solvent from such droplets, and as shown in FIG. 6, it is possible to produce a large amount of particles having a uniform size, and narrow the particle size distribution.

FIG. 6 is a diagram showing an example of the particle size distribution of the particles produced in the granulating and drying step in the embodiment. In FIG. 6, only one narrow peak in the particle size distribution appears and no peak indicating coarse particles appears. In addition, when the size of the discharge hole of the discharging unit for forming droplets and the like are appropriately adjusted, it is possible to adjust the particle size of the particles. In addition, as a device for reducing the particle size of particles, without using a pulverizing device that generates large external stress or a spraying device that applies a high shear force, and instead, by using a discharging unit configured to form droplets by vibration or the like, even if the particle material contains a physiologically active substance having a property of changing physiological activity due to external stress, it is possible to minimize the change in the physiological activity of the physiologically active substance, and as a result, it is possible to minimize the decrease in the degree of physiological activity.

In addition, in this step, during granulation, since contact with a solvent such as water is not necessary, particles with a high proportion of physiologically active substances retained in the particles (physiologically active substance retention rate) can be produced through the particle producing step. According to this step, compared to other methods, it is possible to increase the physiological activity rate of the particles, and for example, the physiological activity rate can be 50% or more.

Here, in the granulating and drying step, droplets are discharged into a transport airflow, the solvent is vaporized from the droplets, and thus the particles may be granulated. The method of vaporizing the solvent from the droplets using a transport airflow is not particularly limited, and can be appropriately selected according to the purpose, and for example, a method of making the transport direction of the transport airflow a direction substantially perpendicular to the direction in which droplets are discharged is preferable. In addition, it is preferable to appropriately adjust the temperature, vapor pressure, gas type and the like of the transport airflow. Here, a heating unit may be provided in order to adjust the temperature of the transport airflow, but as described above, in the granulating step, droplets are discharged while coalescence between the droplets is minimized. Therefore, the heating unit can minimize the degree of heat, and specifically, heating can be performed to such an extent that the physiological activity of the physiologically active substance does not change.

In addition, as long as the collected particles maintain a solid state, the solvent does not have to be completely vaporized, and a separate drying step may be additionally added after collection. In addition, a method of vaporizing the solvent from the droplets by applying the temperature change, chemical change or the like may be used.

—Other Steps—

Other steps are not particularly limited, and can be appropriately selected according to the purpose, and examples thereof include a particle collection step.

The particle collection step is a step in which the produced particles are collected, and can be suitably performed by the particle collecting unit. The particle collecting unit is not particularly limited, and can be appropriately selected according to the purpose, and examples thereof include a cyclone collector and a back filter.

A particle producing device in an embodiment (drying in air) includes a droplet discharging unit configured to discharge droplets containing a substrate, lipid nanoparticles containing a physiologically active substance having physiological activity, and a solvent into a gas, and a granulation unit configured to vaporize the solvent from the droplets, remove the solvent contained in the droplets, and granulate particles, and includes, as necessary, other units.

—Liquid Accommodating Container—

The liquid accommodating container is a container accommodating a liquid containing a substrate, lipid nanoparticles containing a physiologically active substance, and a solvent.

The liquid accommodating container mayor may not be flexible. The material of the liquid accommodating container is not particularly limited, and can be appropriately selected according to the purpose, and for example, it may be made of a resin or a metal. The structure of the liquid accommodating container is not particularly limited, and can be appropriately selected according to the purpose, and for example, it may be a closed structure or a non-closed structure.

—Droplet Discharging Unit—

The droplet discharging unit is a unit configured to discharge a liquid (suspension) containing a substrate, lipid nanoparticles containing a physiologically active substance, and a solvent into a gas medium and form droplets. Such a droplet forming unit is as described in detail in the description of the droplet discharging unit used in the particle producing device of the above embodiment. In a preferable embodiment, the droplet discharging unit discharges a particle composition liquid by vibration and forms droplets.

The droplet discharging unit is connected to the liquid accommodating container. A unit for connecting the droplet discharging unit and the liquid accommodating container is not particularly limited as long as the liquid can be supplied from the liquid accommodating container to the droplet discharging unit, and can be appropriately selected according to the purpose, and examples thereof include pipes (pipes, tubes, etc.).

The droplet discharging unit preferably has a vibration imparting member that discharges droplets by imparting vibration to the liquid. The vibration is not particularly limited, and can be appropriately selected according to the purpose, and for example, the frequency is preferably 1 kHz or more, more preferably 150 kHz or more, and still more preferably 300 kHz or more and 500 kHz or less. When the vibration is 1 kHz or more, the liquid column sprayed from the discharge hole can be formed into droplets with favorable reproducibility, and when the vibration is 150 kHz or more, it is possible to improve production efficiency.

As the droplet discharging unit having a vibration imparting member, for example, an inkjet nozzle is an exemplary example. For the inkjet nozzle discharging mechanism, for example, a liquid column resonance method, a membrane vibration a method, liquid vibration method, a Rayleigh splitting method or the like can be used.

—Granulation Unit—

The granulation unit is a unit for vaporizing the solvent from droplets, removing the solvent contained in the droplets, and granulating particles. As the granulation unit, for example, a member for forming a space for vaporizing the solvent from the droplets is an exemplary example. The granulation unit preferably has a transport airflow forming unit for forming a transport airflow.

Next, a specific aspect of the embodiment will be described based on an aspect using the liquid column resonance droplet discharging unit as the droplet discharging unit. Here, it should be naturally understood by those skilled in the art that the droplet discharging unit is not limited to the liquid column resonance droplet discharging unit, and another droplet discharging unit (for example, a discharging unit using a membrane vibration method, a discharging unit using a Rayleigh splitting method, a discharging unit using a liquid vibration method, etc.) may be used.

First, the liquid column resonance droplet discharging unit, which is one unit constituting the particle producing device, will be described in detail.

FIG. 1 is a schematic cross-sectional view showing an example of the liquid column resonance droplet discharging unit. A liquid column resonance droplet discharging unit 11 has a liquid common supply path 17 and a liquid column resonance liquid chamber 18. The liquid column resonance liquid chamber 18 communicates with the liquid common supply path 17 provided on one wall surface of wall surfaces at both ends in the longitudinal direction. In addition, the liquid column resonance liquid chamber 18 includes a discharge hole 19 for discharging droplets 21 on one wall surface of wall surfaces linked to the wall surfaces at both ends and a vibration generating unit 20 provided on the wall surface that faces the discharge hole 19 and configured to generate high frequency vibration in order to form a liquid column resonance stationary wave. Here, a high frequency power supply is connected to the vibration generating unit 20. In addition, an airflow passage through which an airflow for transporting droplets 21 discharged from a liquid column resonance discharging unit 11 is supplied may be provided.

A liquid 14 (suspension) containing a substrate, lipid nanoparticles containing a physiologically active substance, and a solvent flows into the liquid common supply path 17 of the liquid column resonance droplet discharging unit 11 through a liquid supply pipe by a liquid circulation pump, and is supplied to the liquid column resonance liquid chamber 18. Then, in the liquid column resonance liquid chamber 18 filled with the liquid 14, a pressure distribution is formed with the liquid column resonance stationary wave generated by the vibration generating unit 20. Then, droplets 21 are discharged from the discharge hole 19 arranged in the antinode region of the stationary wave, which is a part of the liquid column resonance stationary wave with a large amplitude and large pressure fluctuation. The antinode region of the stationary wave according to this liquid column resonance is a region other than the node of the stationary wave, and a region of the stationary wave pressure fluctuation that has an amplitude with a sufficient degree to discharge the liquid is preferable, and a region of ±¼ wavelength from the position (node of the velocity stationary wave) at which the amplitude of the pressure stationary wave is maximized toward the position at which the amplitude is minimized is more preferable.

In the antinode region of the stationary wave, even if a plurality of discharge holes are opened, substantially uniform droplets can be formed therefrom, and additionally, droplets can be discharged efficiently, and clogging of the discharge holes is unlikely to occur. Here, the liquid 14 that has passed through the liquid common supply path 17 is circulated through the liquid return pipe. When the amount of the liquid 14 in the liquid column resonance liquid chamber 18 is reduced due to discharging of droplets 21, a suction force acts due to the action of the liquid column resonance stationary wave in the liquid column resonance liquid chamber 18, and the flow rate of the liquid 14 supplied from the liquid common supply path 17 increases. Then, the liquid column resonance liquid chamber 18 is refilled with the liquid 14. Then, when the liquid column resonance liquid chamber 18 is refilled with the liquid 14, the flow rate of the liquid 14 passing through the liquid common supply path 17 is restored to the original rate.

The liquid column resonance liquid chamber 18 in the liquid column resonance droplet discharging unit 11 is formed by bonding frames each formed of a material such as a metal, ceramics, silicone, etc., which has high rigidity that does not influence the resonance frequency of the liquid at a driving frequency. In addition, as shown in FIG. 1, the length L between wall surfaces at both ends of the liquid column resonance liquid chamber 18 in the longitudinal direction is determined based on the principle of liquid column resonance. In addition, it is preferable to arrange a plurality of liquid column resonance liquid chambers 18 for one droplet forming unit in order to dramatically improve productivity. The number of liquid column resonance liquid chambers 18 is not particularly limited, and is preferably 1 or more and 2.000 or less. In addition, for each liquid column resonance liquid chamber, a flow path for liquid supply communicates with and is connected from the liquid common supply path 17, and the liquid common supply path 17 communicates with a plurality of liquid column resonance liquid chambers 18.

In addition, the vibration generating unit 20 in the liquid column resonance droplet discharging unit 11 is not particularly limited as long as it can be driven at a predetermined frequency, and a form in which a piezoelectric component is attached to an elastic plate 9 is preferable.

In addition, it is preferable to use a configuration in which the discharge hole 19 is provided in the liquid column resonance liquid chamber 18 in the width direction because it is possible to provide a large number of openings for the discharge hole 19 and the production efficiency is improved. In addition, since the liquid column resonance frequency varies depending on arrangement of openings for the discharge holes 19, it is desirable to determine the liquid column resonance frequency appropriately by confirming discharging of droplets.

Figure 2:
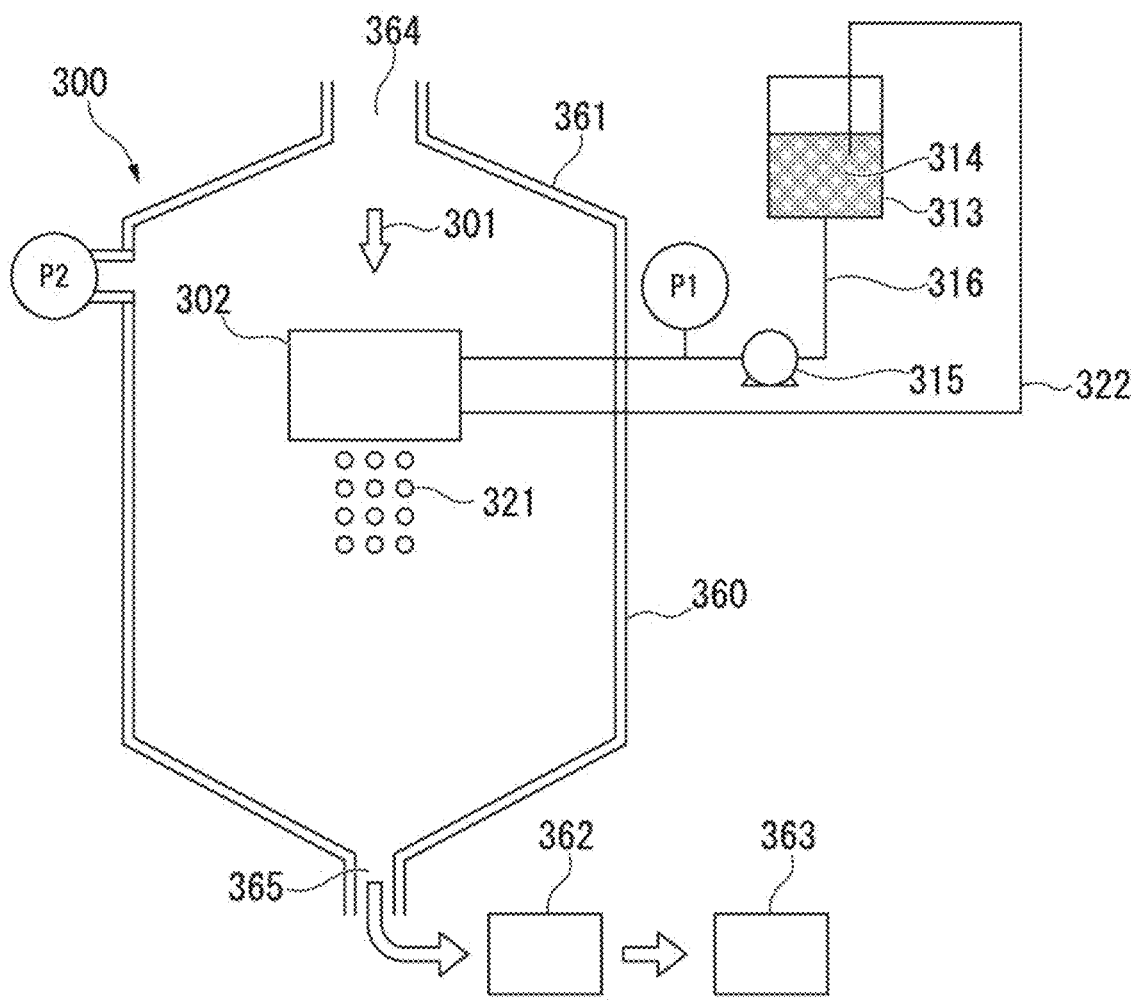
FIG. 2 is a schematic view showing an example of a particle producing device.
Figure 3:
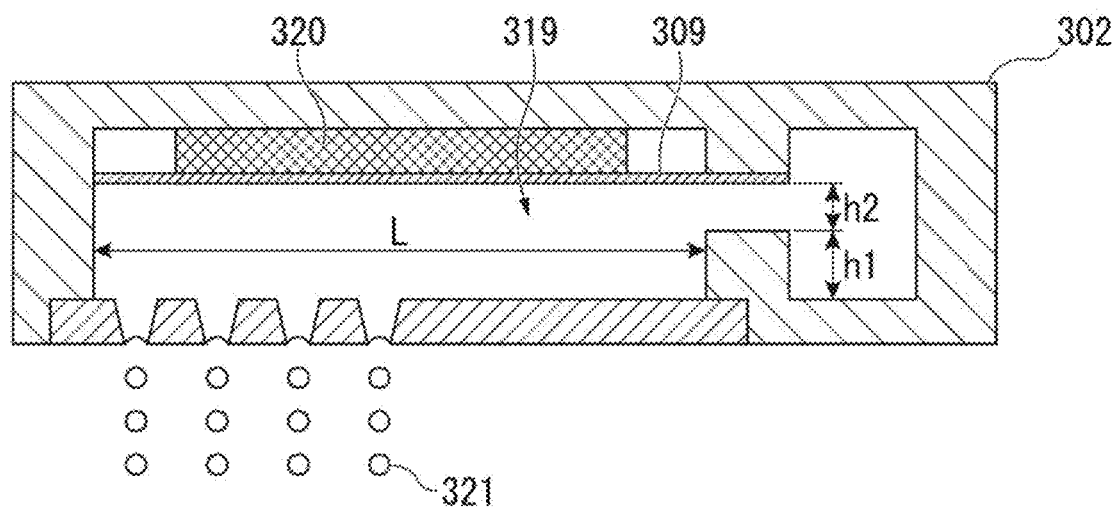
FIG. 3 is a schematic cross-sectional view showing an example of a droplet discharging unit used in the particle producing device.
Figure 4:
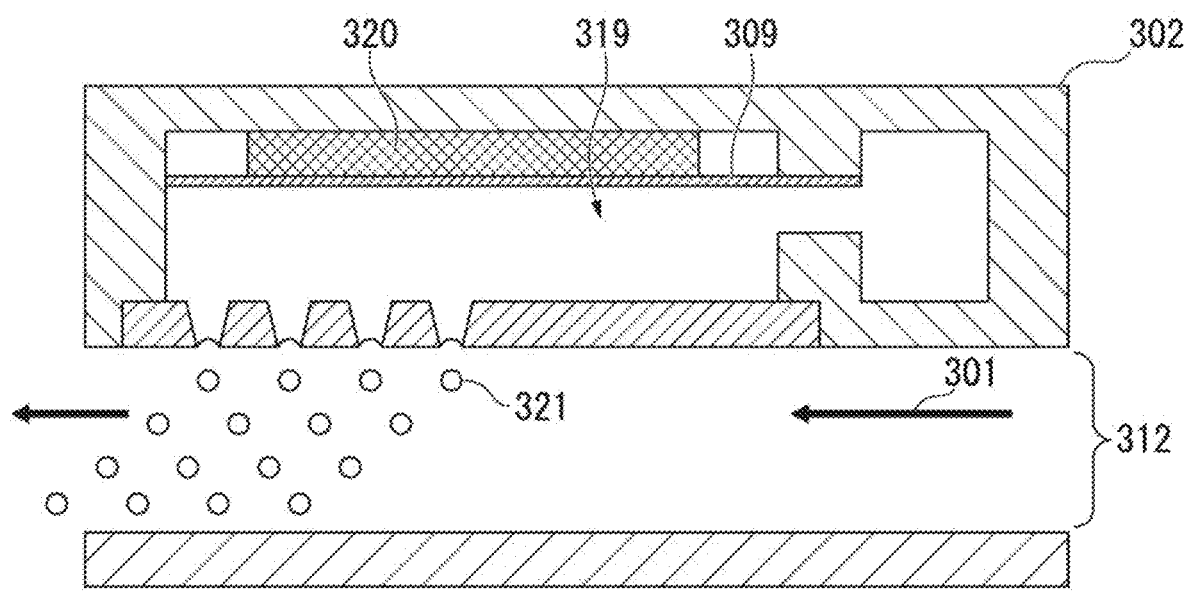
FIG. 4 is a schematic cross-sectional view showing another example of the droplet discharging unit used in the particle producing device.

Next, specific examples of the embodiment will be described with reference to FIGS. 2 to 4. FIG. 2 is a schematic view showing an example of the particle producing device. FIG. 3 is a schematic cross-sectional view showing an example of the droplet discharging unit used in the particle producing device. FIG. 4 is a schematic cross-sectional view showing of another example of the droplet discharging unit used in the particle producing device.

A particle producing device 300 shown in FIG. 2 includes a droplet discharging unit 302, a dry collection unit 360, a transport airflow outlet 365, and a particle storage unit 363. A liquid container 313 accommodating a liquid 314, and a liquid circulation pump 315 that supplies the liquid 314 accommodated in the liquid container 313 to the droplet discharging unit 302 through a liquid supply pipe 316, and additionally pressure-feeds the liquid 314 in the liquid supply pipe 316 in order to return it to the liquid container 313 through a liquid return pipe 322 are linked to the droplet discharging unit 302, and the liquid 314 can be supplied to the droplet discharging unit 302 at any time.

A pressure measuring instrument P1 is provided at the liquid supply pipe 316, a pressure measuring instrument P2 is provided at the dry collection unit, and the liquid feeding pressure toward the droplet discharging unit 302 and the pressure in the dry collection unit are managed by the pressure gauges P1 and P2. In this case, when the pressure measured value at P1 is larger than the pressure measured value at P2, there is a risk of the liquid 314 exuding from the discharge hole, when the pressure measured value at P1 is smaller than the pressure measured value at P2, there is a risk of a gas entering the droplet discharging unit 302 and discharging be stopped so that it is preferable that the pressure measured value at P1 and the pressure measured value at P2 be substantially the same.

In a chamber 361, a descending airflow (transport airflow) 301 formed from a transport airflow inlet 364 is formed.

Droplets 321 discharged from the droplet discharging unit 302 are transported downward not only by gravity but also by the transport airflow 301, pass through the transport airflow outlet 365, and are collected by a particle collecting unit 362 and stored in the particle storage unit 363.

Here, in the droplet discharging step, when discharged droplets come into contact with each other before drying, the droplets may coalesce. In order to obtain particles with a narrow particle size distribution, it is preferable to maintain the distance between the discharged droplets. However, although the discharged droplets have a certain initial velocity, they eventually lose speed due to air resistance. Even when droplets discharged later catch up with the stalled droplets, and droplets are insufficiently dried, the droplets may coalesce. In order to prevent coalescence, it is preferable to transport droplets and dry them while minimizing coalescence with a transport airflow 301 so that the decrease in the velocity of the droplets is minimized and droplets do not come into contact with each other. Therefore, the transport airflow 301 is preferably arranged in the vicinity of the droplet discharging unit 302 in the same direction as the droplet discharge direction. Here, even if droplets come into contact with each other, since they will not coalesce if they are sufficiently dried before contact, in such a case, the transport airflow 301 may not be used.

FIG. 3 is an enlarged view of an example of the droplet discharging unit of the particle producing device in FIG. 2. As shown in FIG. 3, the droplet discharging unit 302 includes a volume changing unit 320, an elastic plate 309, and a liquid accommodating unit 319. The droplet discharging unit 302 deforms when a voltage is applied to the volume changing unit 320, and reduces the volume of the liquid accommodating unit 319 so that the liquid stored in the liquid accommodating unit 319 is discharged as droplets 321 from the discharge hole.

FIG. 4 is a diagram showing another aspect of the droplet discharging unit of the particle producing device. As shown in FIG. 4, in an airflow passage 312, the transport airflow 301 may be in a direction substantially perpendicular to the discharge direction. Here, the transport airflow 301 may have an angle, and preferably has an angle at which droplets are separated from the droplet discharging unit 302. As in FIG. 4, when the volume changing unit 320 changes the volume of the liquid accommodating unit 319 via the elastic plate 309, droplets 321 are discharged, and the transport airflow 301 for preventing coalescence is applied in a direction substantially perpendicular to the discharged droplets 321, it is preferable to arrange discharge holes so that the trajectories through which the droplets pass do not overlap when the droplets 321 are transported from the discharge holes by the transport airflow 301 for preventing coalescence. In addition, after coalescence is prevented by the transport airflow 301, the particles may be transported to the particle collecting unit by another airflow.

The velocity of the transport airflow is preferably equal to or higher than the droplet discharge speed. When the velocity of the transport airflow is faster than the droplet discharge speed, it is possible to minimize coalescence between droplets. In addition, a chemical substance that promotes drying of droplets may be mixed into the transport airflow. The state of the transport airflow is not limited and may be a laminar flow, a swirling flow or a turbulent flow. The type of the gas constituting the transport airflow is not particularly limited, and can be appropriately selected according to the purpose, and air or a nonflammable gas such as nitrogen may be used. In addition, the temperature of the transport airflow can be appropriately adjusted, but it is a temperature at which the physiological activity of the physiologically active substance contained in the droplets does not change according to the temperature of the airflow.

When the amount of the residual solvent contained in the particles obtained by the particle collecting unit 362 shown in FIG. 2 is large, in order to reduce the amount, as necessary, it is preferable to perform secondary drying. As secondary drying, a general known drying method such as fluidized bed drying and vacuum drying can be used.

EXAMPLES

Hereinafter, production examples of particles will be described, but the present invention is not limited to these production methods.

Production Example 1

(Preparation of Suspension of Lipid Nanoparticles Containing a Physiologically Active Substance)
<<Preparation of Ethanol Solution>>
0.8 parts by mass of cyclosporine A (commercially available from Tokyo Chemical Industry Co., Ltd.) as a physiologically active substance, 0.3 parts by mass of stearic acid (commercially available from Tokyo Chemical Industry Co., Ltd.) as a lipid were added to with respect to 100 parts by mass of ethanol as a solvent 1 and the mixture was stirred with a vortex for 30 minutes to obtain an ethanol solution.
<<Preparation of Aqueous Solution>>
0.03 parts by mass of soy lecithin (commercially available from Tokyo Chemical Industry Co., Ltd.) as an additive, and 78 parts by mass of mannitol (commercially available from Tokyo Chemical Industry Co., Ltd.) as a substrate were added with respect to 2,400 parts by mass of water as a solvent 2, and the mixture was stirred using a stirrer at 600 rpm for 1 hour to obtain an aqueous solution.
<<Preparation of Lipid Nanoparticles>>
While the aqueous solution was stirred at 600 rpm, the ethanol solution was added dropwise into the aqueous solution with a syringe, and thereby a suspension of lipid nanoparticles containing cyclosporine A (hereinafter referred to as "suspension of Production Example 1") was obtained.
<<Measurement of Particle Size of Lipid Nanoparticles>>
The particle size of the lipid nanoparticles in the suspension of Production Example 1 was measured using FPAR-1000 (commercially available from Otsuka Electronics Co., Ltd.). The average particle size of the obtained lipid nanoparticles was 190 nm.

Production Example 2

(Preparation of Suspension of Lipid Nanoparticles Containing a Physiologically Active Substance)
A suspension of Production Example 2 was prepared in the same manner as in Production Example 1 except that soy lecithin was not added in the aqueous solution preparing step in Production Example 1.

Production Example 3

A suspension of Production Example 3 was prepared in the same manner as in Production Example 1 except that mannitol was not added in the aqueous solution preparing step in Production Example 1.

Example 1

(Preparation of Lipid Nanoparticle-Containing Microparticles)

<<Production of Particle of Example 1 (Liquid Column Resonance Method)>>

In the liquid column resonance droplet discharging unit shown in FIG. 1, using a droplet discharging unit having one opening for the discharge port per liquid column resonance chamber, the suspension of Production Example 1 was discharged from the discharge port and formed into droplets, the solvent was removed from the droplets using the particle producing device shown in FIG. 2, and thus particles of Example 1 were obtained. Particle production conditions are as follows.

—Particle Production Conditions—
Shape of discharge port: perfect circle
Diameter of discharge port: 8 μm
Dry airflow rate: dry nitrogen 50 L/min
Dry airflow temperature: 50° C.

(Evaluation of Particle)

<<Measurement of Particle Size of Microparticle>>

The particle size distribution of the particles of Example 1 was measured using Microtrac MT3000II (commercially available from MicrotracBel Corp.). The results are shown in the following Table 2.

<<Confirmation of Fluidity>>

In order to simply evaluate the fluidity of the particles of Example 1, 1 g of the particles of Example 1 was introduced into a 30 mm glass funnel (commercially available from As One Corporation), and the time until the sample was flowed out from the funnel was evaluated. Determination criteria were as follows. Here, the particles of determination criteria A and B had fluidity that did not cause problems in practical handling. The results are shown in Table 1.

—Determination Criteria—
A: less than 15 seconds
B: 15 seconds or more to less than 30 seconds
C: 30 seconds or more

Example 2

(Preparation of Lipid Nanoparticle-Containing Microparticles)

<<Production of Particle of Example 2 (4-Fluid Spray Nozzle)>>

The suspension of Production Example 2 was discharged using a spray drying unit (4-fluid nozzle, commercially available from Fujisaki Electric Co., Ltd.) to obtain particles of Example 2. Particle production conditions are as follows. Subsequently, the particles of Example 2 were evaluated in the same manner as the particles of Example 1. The composition and evaluation results of the particles of Example 2 are shown in the following Table 2.

—Particle Production Conditions—
Amount of suspension of Production Example 2 sent to nozzle: 10 m L/min
Orifice pressure: 1.3 kPa
Dry airflow rate: dry nitrogen: 30 L/min
Dry airflow temperature: 65° C.

Example 3

(Preparation of Lipid Nanoparticle-Containing Microparticles)

<<Production of Particle of Example 3 (Rayleigh Fission)>>

The suspension of Production Example 1 was discharged using a Rayleigh fission droplet discharging unit to obtain particles of Example 3. Particle production conditions are as follows. Subsequently, the particles of Example 3 were evaluated in the same manner as in the particles of Example 1. The composition and evaluation results of the particles of Example 3 are shown in the following Table 2.

—Particle Production Conditions—
Shape of discharge port: perfect circle
Diameter of discharge port: 20 μm
Prescribed liquid extrusion pressure: 0.20 MPa
Excitation frequency: 70 kHz
Excitation voltage: 5 V

Comparative Example 1

(Preparation of Dry Lipid Nanoparticles)

The suspension of Production Example 3 was freeze-dried under conditions of the following Table 1 to obtain dry lipid nanoparticles (particles) of Comparative. Example 1. Subsequently, the particles of Comparative Example 1 were evaluated in the same manner as the particles of Example 1. The composition and evaluation results of the particles of Comparative Example 1 are shown in the following Table 2.

TABLE 1

| | Dry component production conditions | | | |
|---|---|---|---|---|
| | Preliminary freezing | Decompression step | Primary drying | Secondary drying |
| Shelf temperature [° C.] | −40 | −40 | −10 | 20 |
| Retention time [min] | 180 | 60 | 120 | 1080 |
| Target range [° C.] | 5 | 5 | 3 | 3 |

TABLE 2

| | | Example 1 | Example 2 | Example 3 | Comparative Example 1 |
|---|---|---|---|---|---|
| Lipid | Name | Stearic acid | Stearic acid | Stearic acid | Stearic acid |
| | Parts by mass | 0.3 | 0.3 | 0.3 | 0.3 |
| Physiologically active substance | Name | Cyclosporine | Cyclosporine | Cyclosporine | Cyclosporine |
| | Parts by mass | 0.8 | 0.8 | 0.8 | 0.8 |
| Solvent 1 | Name | Ethanol | Ethanol | Ethanol | Ethanol |
| | Parts by mass | 100 | 100 | 100 | 100 |

TABLE 2-continued

|  |  | Example 1 | Example 2 | Example 3 | Comparative Example 1 |
|---|---|---|---|---|---|
| Solvent 2 | Name | Water | Water | Water | Water |
|  | Parts by mass | 2400 | 2400 | 2400 | 2400 |
| Substrate | Name | Mannitol | Mannitol | Mannitol | Mannitol |
|  | Parts by mass | 78 | 78 | 78 | 0 |
| Additive | Name | Soy lecithin | Soy lecithin | Soy lecithin | Soy lecithin |
|  | Parts by mass | 0.03 | 0 | 0.03 | 0.03 |
| Granulation method |  | Liquid resonance | 4-fluid nozzle | Rayleigh fission | Freeze-drying |
| Particle size distribution | Volume average diameter [μm] | 3.9 | 3.2 | 11.9 | 0.27 |
|  | SPAN FACTOR | 0.7 | 1.2 | 0.8 | 1.2 |
|  | Fluidity | B | B | A | C |

In Table 2, "volume average diameter" is synonymous with "volume average particle size," and "SPAN FACTOR" is synonymous with "Relative Span Factor (R. S. F.)"

Test Example 1

(Confirmation of Redispersibility of Lipid Nanoparticles)

The redispersibility of lipid nanoparticles in microparticles was evaluated. Specifically, the prepared particles of Example 1 were dispersed in water again, and the particle size of the lipid nanoparticles was measured. FPAR-1000 (commercially available from Otsuka Electronics Co., Ltd.) was used for measurement. As a result, the nanoparticle diameter was 160 nm, which was the same result as the measurement result of the suspension of Production Example 1.

Test Example 2

(Elution Test)

An elution test was performed on the lipid nanoparticle-containing microparticles of Example 1, and the drug elution behavior was evaluated. A simulated lung fluid (SLF) was used as a test solution for the elution test. The SLF was prepared by dissolving 0.169 g of magnesium chloride, 5.016 g of sodium chloride, 0.249 g of potassium chloride, 0.059 g of anhydrous sodium sulfate, 0.306 g of calcium chloride dehydrate, 0.794 g of sodium acetate trihydrate, 2.170 g of sodium hydrogen carbonate, 0.080 g of sodium citrate dihydrate, 0.118 g of disodium hydrogen phosphate and 0.167 g of dipalmitoylphosphatidylcholine in 100 mL of water and then filling up to 1 L of water.

In 50 mL of SLF at 37° C., 1 mg of a cyclosporine bulk powder or lipid nanoparticle formulation (as the amount of cyclosporine) was dispersed, and the elution test was performed using an elution testing device (NTR-6100A, commercially available from Toyama Sangyo Co., Ltd.) according to a paddle method (a stirring speed of 50 rpm).

0.25, 0.5, 1, 2, and 4 hours after the test started, 100 μL of the eluate was collected. Subsequently, the collected sample was centrifuged at 10,000×g, the supernatant was then collected, dilution with methanol was performed, the sample was subjected to ultra high performance liquid chromatography (commercially available from Waters) using a single quadrupole mass spectrometer (device name "AQUITY SQD," commercially available from Waters) as a detector, and the amount of cyclosporine was quantified.

Figure 7:
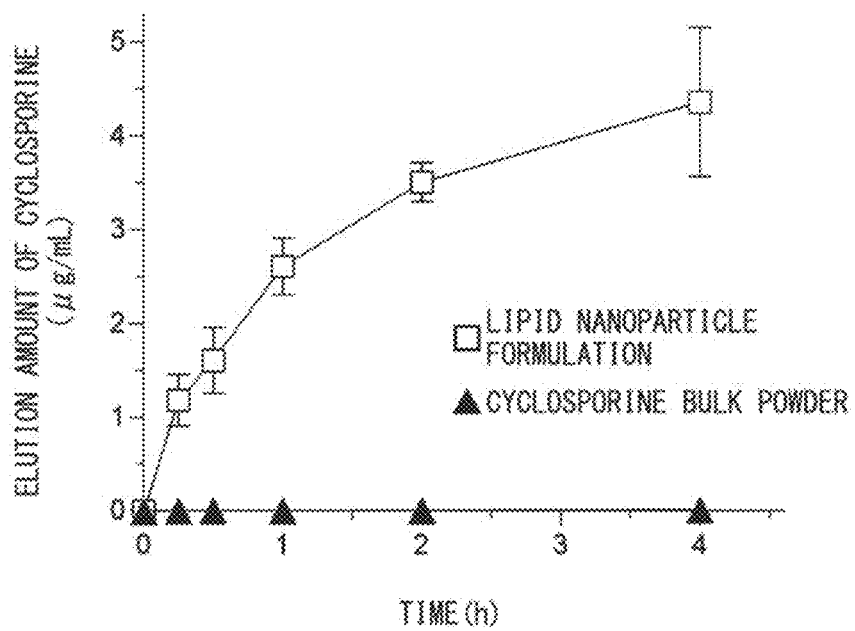
FIG. 7 is a graph showing drug elution behavior of lipid nanoparticle-containing microparticles in Test Example 2.

FIG. 7 is a graph showing the drug elution behavior. As shown in FIG. 7, since the cyclosporine bulk powder was a poorly water-soluble compound, the elution amount was very low even 4 hours after the test started. On the other hand, the lipid nanoparticle formulation exhibited a higher elution rate than the cyclosporine bulk powder, but the elution velocity was slow. This elution was caused because the drug was encapsulated into lipid nanoparticles and thus the solubility was improved due to nanogranulation and a sustained release property derived from a lipid matrix structure was imparted.

Test Example 3

(Inhalation Characteristics)

In order to examine the applicability of the lipid nanoparticle-containing microparticles of Example 1 and Example 2 as a pulmonary powder inhalant, the inhalation characteristics were evaluated using an under type cascade impactor. Measurement was performed under the following measurement conditions according to the method described in USP 2000 "Physical Tests and Determinations/Aerosols," and "Multistage Cascade Impactor Apparatus."

—Measurement Conditions—
   Device: Andersen Sampler (AN-200, commercially available from Sibata Scientific Technology Ltd.)
   Pump flow rate: 28.3 L/min
   Device used: Jethaler (registered trademark) (commercially available from Hitachi Automotive Systems, Ltd.)

About 30 mg of the prepared powder formulation was filled into Japanese Pharmacopoeia No. 2 HPMC capsule, and evaluated under an airflow rate of 28.3 L/min.

Figure 8A:
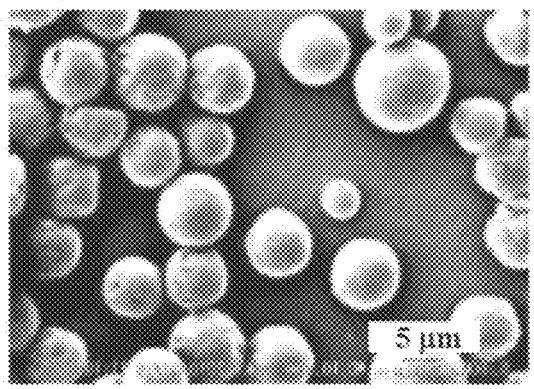
FIG. 8A shows an electron microscope image of lipid nanoparticle-containing microparticles of Example 1.
Figure 8B:
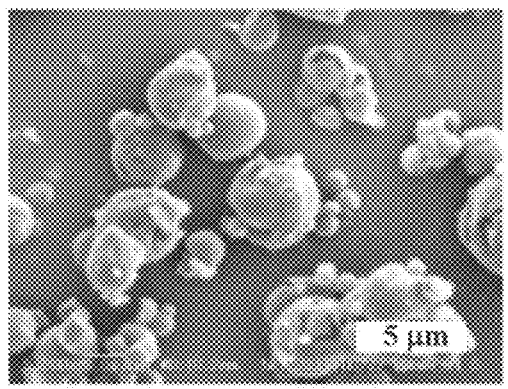
FIG. 8B shows an electron microscope image of lipid nanoparticle-containing microparticles of Example 2.
Figure 9:
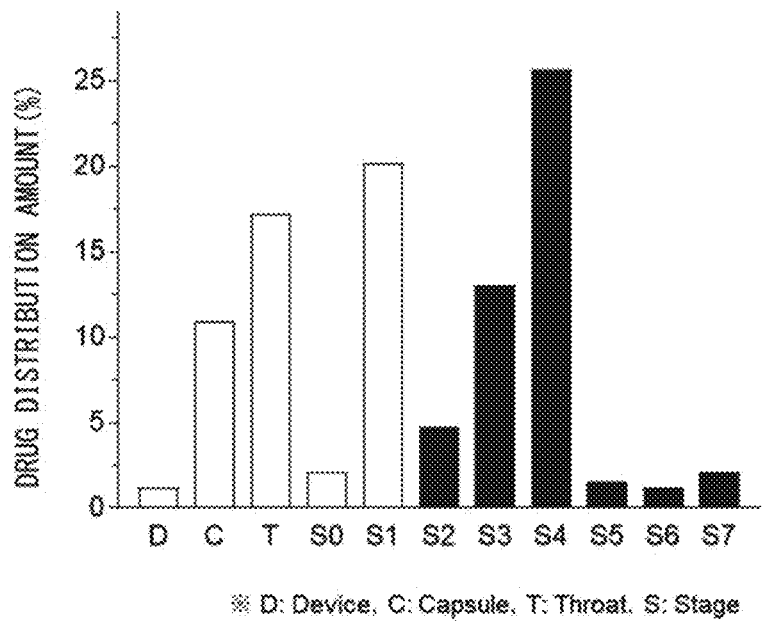
FIG. 9 is a graph showing the evaluation results of the inhalation characteristics of particles of Example 1 in Test Example 3.
Figure 10:
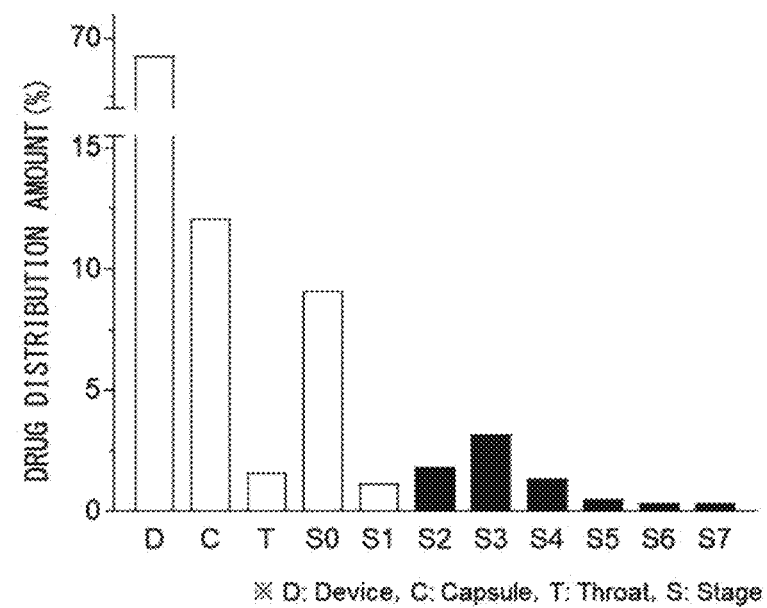
FIG. 10 is a graph showing the evaluation results of the inhalation characteristics of particles of Example 2 in Test Example 3.

FIG. 8A shows an electron microscope image of particles of Example 1. FIG. 8B shows an electron microscope image of particles of Example 2. In addition. FIG. 9 is a graph showing the evaluation results of the inhalation characteristics of particles of Example 1. FIG. 10 is a graph showing the evaluation results of the inhalation characteristics of particles of Example 2. In FIGS. 9 and 10, particles distributed in Stage 2 to Stage 7 showed the theoretical amounts inhaled by humans that reached the lungs from the respiratory tract, and defined as Fine Particle Fraction (FPF) values. Based on the results of FIG. 9, the FPF value of the particles of Example 1 was calculated to be 48.4%. In addition, based on the results of FIG. 10, the FPF value of the particles of Example 2 was calculated to be 19.9%.

It was thought that the particles of Example 1 had a more uniform particle size distribution than the particles of Example 2 and did not contain fine particles having an excellent adhesion property, and thus exhibited an excellent dispersion property. In addition, when the aerodynamic particle size was calculated from these results, the aerodynamic particle size of the particles of Example 1 was 3.5 µm, and the aerodynamic particle size of the particles of Example 2 was 4.7 µm.

Test Example 4

(Animal Test)

Pharmacokinetic evaluation was performed after the lipid nanoparticle-containing microparticles of Example 1 were intratracheally administered. Specifically, first, the particles of Example 1 and cyclosporine A bulk powder nanoparticles prepared by the precipitation method were administered intratracheally to SD male rats (6 to 8 weeks old, commercially available from Japan SLC., Inc.), and the concentration of the drug in the blood was measured over time, 100 µg (as the amount of cyclosporine A) of each powder was administered using a dry powder insufflator (DP-4, commercially available from Penn-Century Inc.). As a control group, a group to which 10 mg/kg of Neoral (commercially available from Novartis International AG) as a current oral formulation of cyclosporine A was forcibly orally administered was used.

After drug administration, blood was collected from the tail vein over time, transferred to a micro test tube treated with heparin, and immediately ice cooled. After ice-cooling, the blood was quickly centrifuged to obtain plasma. In addition, 3 hours after each formulation was administered, the lungs were excised from the rats, minced, and the drug contained in the lung tissue was then extracted with ethyl acetate.

The obtained plasma and lung tissue extract samples were subjected to ultra high performance liquid chromatography (commercially available from Waters) using a single quadrupole mass spectrometer (device name: AQUITY SQD, commercially available from Waters) as a detector, and the drug content was quantified.

Figure 11:
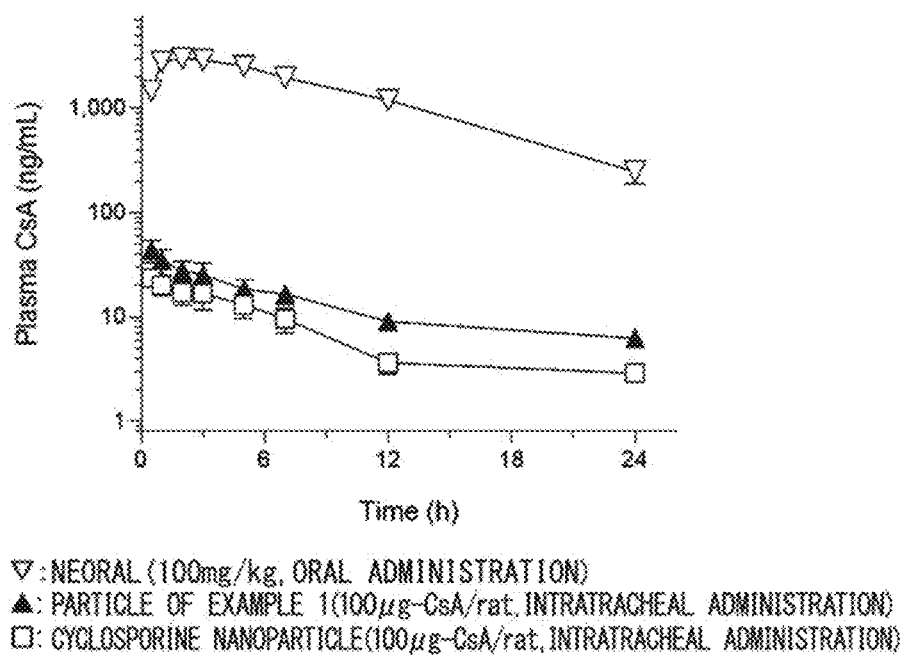
FIG. 11 is a graph showing the change in the concentration of cyclosporine in the blood in Test Example 4.
Figure 12:
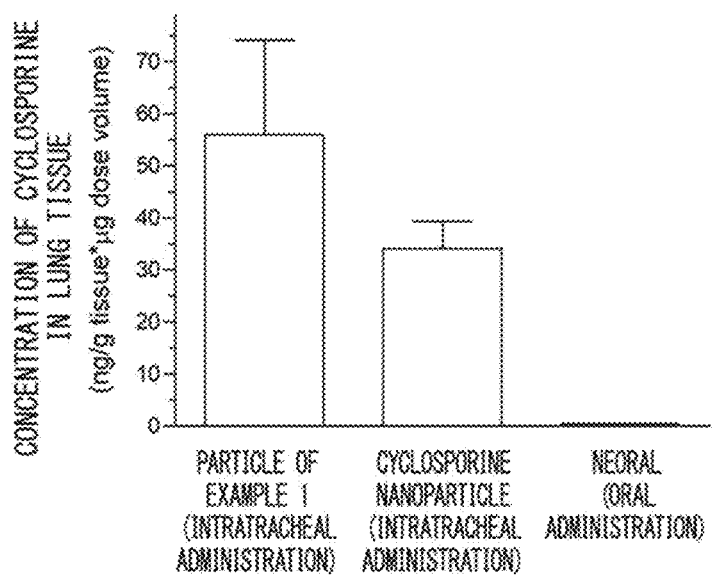
FIG. 12 is a graph showing the concentration of cyclosporine in lung tissue in Test Example 4.

FIG. 11 is a graph showing the change in the concentration of the drug in the blood of groups. In addition, FIG. 12 is a graph showing the measurement results of the concentration in lung tissue of groups. In addition, the following Table 3 shows $C_{max}$, $T_{1/2}$ and $AUC_{0-\infty}$ of the groups. In Table 3, $C_{max}$ indicates the maximum blood concentration (concentration at the peak of the blood concentration curve). In addition, Tin indicates a half-life of the concentration of the drug in the blood. In addition, $AUC_{0-\infty}$ indicates an area under curve of the blood concentration from the start of administration to disappearance of the drug.

As a result, it was clearly understood that, after intratracheal administration of the particles of Example 1 and cyclosporine nanoparticles, systemic exposure was significantly lower compared to when a current formulation Neoral was orally administered (10 mg/kg). On the other hand, the drug concentration per unit dose in the lung tissue was the highest for the particles of Example 1, and the lung tissue concentration after Neoral oral administration was signifi-
cantly low. Accordingly, it was found that the powder inhalant that could be administered locally to the lung at a low dose enabled efficient drug delivery to the administration site while reducing systemic exposure, and was useful for safe and effective treatment as a dosage form for inflammatory diseases of the respiratory system and the like.

In addition, the particles of Example 1 exhibited a higher lung tissue concentration tendency than simple cyclosporine nanoparticles. Based on these results, it was speculated that a drug sustained release property of lipid nanoparticles contributed to prolongation of drug exposure in the lung.

TABLE 3

|  | $C_{max}$ (ng/mL) | $T_{1/2}$ (h) | $AUC_{0-\infty}$ (ng · h/mL) |
|---|---|---|---|
| Neoral 10 mg/kg, oral administration | 3,200 ± 170 | 2.3 ± 0.59 | 35,500 ± 3,200 |
| Particle of Example 1. 100 µg/rat, intratracheal administration | 44 ± 15 | 2.6 ± 0.82 | 324 ± 79.2 |
| Cyclosporine nanoparticles, 100 µg/rat, intratracheal administration | 24 ± 5.1 | 4.8 ± 2.4 | 177 ± 38.0 |

The present invention includes the following aspects.

[1] A particle including at least one or more kind of substrate and lipid nanoparticles.
   wherein the lipid nanoparticles are dispersed in the substrate, and
   wherein the lipid nanoparticles are one or more kind selected from the group consisting of liposomes, lipid emulsions and solid lipid nanoparticles, and contain a physiologically active substance.

[2] The particle according to [1],
   wherein one or more kind of the substrate contain a water soluble material.

[3] The particle according to [1] or [2],
   wherein the substrate includes one or more kind of sugar selected from the group consisting of monosaccharides, disaccharides, polysaccharides, sugar alcohols and derivatives thereof.

[4] The particle according to any one of [1] to [3],
   wherein the substrate includes one or more kind of sugar selected from the group consisting of lactose and mannitol.

[5] The particle according to any one of [1] to [4],
   wherein the volume average particle size is 0.5 µm or more and 100 µm or less.

[6] The particle according to [5],
   wherein the volume average particle size is 1 µm or more and 25 µm or less.

[7] A powder inhalant including the particle according to any one of [1] to [6] as an active component.

[8] A production method for the particle according to any one of [1] to [6], including a granulating and drying step in which a suspension containing the substrate and the lipid nanoparticles is granulated and dried in a gas medium.

[9] The production method according to [8],
   wherein the granulating and drying step includes
   a droplet discharging step in which vibration is imparted to a suspension containing the substrate and the lipid nanoparticles accommodated in a liquid column resonance liquid chamber to form a stationary wave due to liquid column resonance, and the suspension is discharged as droplets from a discharge port formed in an amplitude direction of the stationary wave in an antinode region of the stationary wave, and

a particle forming step in which the discharged suspension is dried to form particles.

CITATION LIST

Patent Document

[Patent Document 1]
Japanese Patent No. 4228230
[Patent Document 2]
Japanese Patent No. 5932993
[Patent Document 3]
Japanese Unexamined Patent Application. First Publication No. H08-133986

The invention claimed is:

1. A production method for a particle, the particle comprising:
   at least one or more kinds of a substrate, and at least one or more kinds of lipid nanoparticles,
   wherein the lipid nanoparticles are dispersed in the substrate,
   wherein the lipid nanoparticles are selected from the group consisting of liposomes, lipid emulsions and solid lipid nanoparticles, and contain a physiologically active substance;
   wherein the physiologically active substance has a property of irreversibly changing physiological activity by heating, cooling, or external stress;
   wherein the production method comprises granulating and drying, in which a suspension containing the substrate and the lipid nanoparticles is granulated and dried in a gas medium;
   wherein the granulating and drying includes droplet discharging, in which vibration is imparted to the suspension containing the substrate and the lipid nanoparticles accommodated in a liquid column resonance liquid chamber, to form a stationary wave due to liquid column resonance, and the suspension is discharged as droplets from a discharge port formed in an amplitude direction of the stationary wave in an antinode region of the stationary wave, and
   particle forming, in which the discharged suspension is dried to form particles.

2. The production method according to claim 1, wherein the substrate contains a water soluble material.

3. The production method according to claim 1, wherein the substrate includes at least one sugar selected from the group consisting of: monosaccharides, disaccharides, polysaccharides, sugar alcohols, and derivatives thereof.

4. The production method according to claim 1, wherein the substrate includes at least one sugar selected from the group consisting of: lactose and mannitol.

5. The production method according to claim 1, wherein the volume average particle size of the particle comprising the at least one or more kinds of the substrate and the at least one or more kinds of lipid nanoparticles is 0.5 μm or more and 100 μm or less.

6. The production method according to claim 5, wherein the volume average particle size of the particle comprising the at least one or more kinds of the substrate and the at least one or more kinds of lipid nanoparticles is 1 μm or more and 25 μm or less.

* * * * *